US011867991B2

(12) United States Patent
Inada et al.

(10) Patent No.: US 11,867,991 B2
(45) Date of Patent: *Jan. 9, 2024

(54) PHOTODETECTION SYSTEM

(71) Applicant: Panasonic Intellectual Property Management Co., Ltd., Osaka (JP)

(72) Inventors: Yasuhisa Inada, Osaka (JP); Atsushi Ishikawa, Osaka (JP); Yumiko Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,802

(22) Filed: Sep. 14, 2022

(65) Prior Publication Data

US 2023/0027122 A1 Jan. 26, 2023

Related U.S. Application Data

(63) Continuation of application No. 17/151,398, filed on Jan. 18, 2021, now Pat. No. 11,480,818, which is a
(Continued)

(30) Foreign Application Priority Data

Oct. 23, 2018 (JP) ................................ 2018-199108

(51) Int. Cl.
  *G02F 1/133* (2006.01)
  *G02B 6/12* (2006.01)
  (Continued)

(52) U.S. Cl.
  CPC ..... *G02F 1/13312* (2021.01); *G02B 6/12009* (2013.01); *G02B 6/29343* (2013.01); *G02B 6/3546* (2013.01)

(58) Field of Classification Search
  CPC .... G02F 1/13312; G02F 1/1326; G02F 1/295; G02B 6/12009; G02B 6/29343;
  (Continued)

(56) References Cited

U.S. PATENT DOCUMENTS 7,064,710 B1 6/2006 Ksienski et al.
10,698,086 B1 6/2020 Zhu et al.
(Continued)

FOREIGN PATENT DOCUMENTS

JP 2-216489 8/1990
JP 6-503898 4/1994
(Continued)

OTHER PUBLICATIONS

International Search Report of PCT application No. PCT/JP2019/028603 dated Oct. 21, 2019.
(Continued)

*Primary Examiner* — John Bedtelyon
(74) *Attorney, Agent, or Firm* — Rimon, P.C.

(57) ABSTRACT

An optical scan device includes an optical waveguide array, including a plurality of optical waveguides each of which propagates light along a first direction, that emits a light beam, the plurality of optical waveguides being arranged in a second direction that intersects the first direction, a phase shifter array including a plurality of phase shifters connected separately to each of the plurality of optical waveguides, a control circuit that controls a phase shift amount of each of the plurality of phase shifters and/or inputting of light to each of the plurality of phase shifters and thereby controls a direction and shape of the light beam that is emitted from the optical waveguide array, a photodetector that detects the light beam reflected by a physical object, and a signal processing circuit that generates distance distribution data on the basis of output from the photodetector.

17 Claims, 21 Drawing Sheets

Related U.S. Application Data continuation of application No. PCT/JP2019/028603, filed on Jul. 22, 2019.

(51) Int. Cl.
*G02B 6/293* (2006.01)
*G02B 6/35* (2006.01)

(58) Field of Classification Search
CPC ....... G02B 6/3546; G01S 7/481; G01S 17/93; G01S 17/89
See application file for complete search history.

(56) References Cited

U.S. PATENT DOCUMENTS

| | | | |
|---|---|---|---|
| 11,480,818 B2* | 10/2022 | Inada | G02B 6/29343 |
| 2016/0245903 A1 | 8/2016 | Kalscheur et al. | |
| 2018/0217258 A1 | 8/2018 | Hirasawa et al. | |
| 2018/0372951 A1 | 12/2018 | Hashiya et al. | |
| 2019/0004393 A1 | 1/2019 | Hashiya et al. | |

FOREIGN PATENT DOCUMENTS

| | | |
|---|---|---|
| JP | 2000-075030 | 3/2000 |
| JP | 2008-178034 | 7/2008 |
| JP | 2013-016591 | 1/2013 |
| JP | 2014-036325 | 2/2014 |
| JP | 2016-508235 | 3/2016 |
| JP | 2017-139571 | 8/2017 |
| JP | 2018-010118 | 1/2018 |
| JP | 2018-050106 | 3/2018 |
| JP | 2018-124271 | 8/2018 |
| WO | 1992/011551 | 7/1992 |
| WO | 2013/168266 | 11/2013 |
| WO | 2014/110017 | 7/2014 |
| WO | 2018/061231 | 4/2018 |
| WO | 2018/061515 | 4/2018 |

OTHER PUBLICATIONS

Non-Final Office Action dated Apr. 1, 2022 issued in U.S. Appl. No. 17/151,398.
Notice of Allowance dated Jun. 29, 2022 issued in U.S. Appl. No. 17/151,398.

* cited by examiner

PHOTODETECTION SYSTEM

RELATED APPLICATIONS

This application is a continuation of U.S. patent application Ser. No. 17/151,398, filed on Jan. 18, 2021, which is a continuation of International Patent Application No. PCT/JP2019/028603, filed on Jul. 22, 2019, which claims the benefit of foreign priority of Japanese Patent Application No. 2018-199108 filed on Oct. 23, 2018, the contents all of which are incorporated herein by reference.

BACKGROUND

1. Technical Field

The present disclosure relates to a photodetection system.

2. Description of the Related Art

There have conventionally been proposed various types of device that are capable of scanning space with light.

International Publication No. 2013/168266 and U.S. Patent Application Publication No. 2016/0245903 each disclose a configuration in which an optical scan can be performed with a mirror-rotating driving apparatus.

Japanese Unexamined Patent Application Publication (Translation of PCT Application) No. 2016-508235 discloses an optical phased array having a plurality of two-dimensionally arrayed nanophotonic antenna elements. Each antenna element is optically coupled to a variable optical delay line (i.e. a phase shifter). In this optical phased array, a coherent light beam is guided to each antenna element by an optical waveguide, and the phase of the light beam is shifted by the phase shifter. This makes it possible to vary the amplitude distribution of a far-field radiating pattern.

Japanese Unexamined Patent Application Publication No. 2013-16591 discloses an optical deflection element including: an optical waveguide including an optical waveguide layer through the inside of which light is guided and first distributed Bragg reflectors formed on upper and lower surfaces, respectively, of the optical waveguide layer; a light entrance through which light enters the optical waveguide, and a light exit formed on a surface of the optical waveguide to let out light having entered through the light entrance and being guided through the inside of the optical waveguide.

SUMMARY

One non-limiting and exemplary embodiment provides a photodetection system that performs a distance measurement while actively changing the direction and shape of a light beam.

In one general aspect, the techniques disclosed here feature a photodetection system including: an optical waveguide array, including a plurality of optical waveguides each of which propagates light along a first direction, that emits a light beam, the plurality of optical waveguides being arranged in a second direction that intersects the first direction; a phase shifter array including a plurality of phase shifters connected separately to each of the plurality of optical waveguides; a control circuit that controls a phase shift amount of each of the plurality of phase shifters and/or inputting of light to each of the plurality of phase shifters and thereby controls a direction and shape of the light beam that is emitted from the optical waveguide array; a photodetector that detects the light beam reflected by a physical object; and a signal processing circuit that generates distance distribution data on the basis of output from the photodetector.

It should be noted that general or specific embodiments may be implemented as a device, a system, a method, or any selective combination thereof.

An aspect of the present disclosure makes it possible to perform a distance measurement while actively changing the direction and shape of a light beam.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
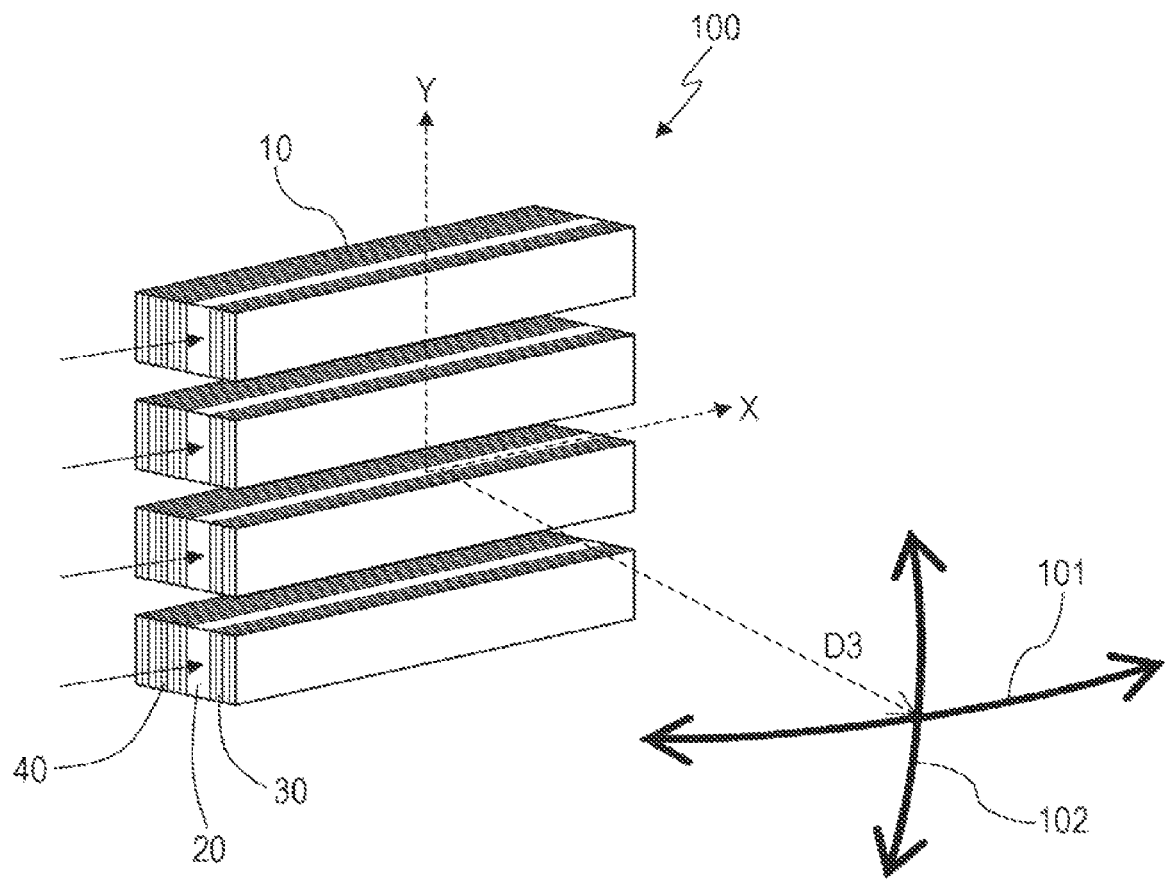
FIG. 1 is a perspective view schematically showing a configuration of an optical scan device according to an exemplary embodiment of the present disclosure.

Prior to a description of embodiments of the present disclosure, underlying knowledge forming the basis of the present disclosure is described.

The inventors found that a conventional optical scan device has difficulty in scanning space with light without making a complex apparatus configuration.

For example, the technology disclosed in International Publication No. 2013/168266 requires a mirror-rotating driving apparatus. This undesirably makes a complex apparatus configuration that is not robust against vibration.

In the optical phased array described in Japanese Unexamined Patent Application Publication (Translation of PCT Application) No. 2016-508235, it is necessary to divide light into lights, introduce the lights into a plurality of column waveguide and a plurality of row waveguides, and guide the lights to the plurality of two-dimensionally arrayed antenna elements. This results in very complex wiring of optical waveguides through which to guide the lights. This also makes it impossible to attain a great two-dimensional scanning range. Furthermore, to two-dimensionally vary the amplitude distribution of emitted light in a far field, it is necessary to connect phase shifters separately to each of the plurality of two-dimensionally arrayed antenna elements and attach phase-controlling wires to the phase shifters. This causes the phases of lights falling on the plurality of two-dimensionally arrayed antenna elements to vary by a different amount. This makes the elements very complex in configuration.

The inventors focused on the foregoing problems in the conventional technologies and studied configurations to solve these problems. The inventors found that the foregoing problems can be solved by using an optical waveguide element having a pair of mirrors facing each other and an optical waveguide layer sandwiched between the mirrors. One of the pair of mirrors of the optical waveguide element has a higher light transmittance than the other and lets out a portion of light propagating through the optical waveguide layer. As will be mentioned later, the direction of light emitted (or the angle of emission) can be changed by adjusting the refractive index or thickness of the optical waveguide layer or the wavelength of light that is inputted to the optical waveguide layer. More specifically, by changing the refractive index, the thickness, or the wavelength, a component constituting the wave number vector (wave vector) of the emitted light and acting in a direction along a lengthwise direction of the optical waveguide layer can be changed. This allows a one-dimensional scan to be achieved.

Furthermore, in a case where an array of a plurality of the optical waveguide elements is used, a two-dimensional scan can be achieved. More specifically, a direction in which lights going out from the plurality of optical waveguide elements reinforce each other can be changed by giving an appropriate phase difference to lights that are supplied to the plurality of optical waveguide elements and adjusting the phase difference. A change in phase difference brings about a change in a component constituting the wave number vector of the emitted light and acting in a direction that intersects the direction along the lengthwise direction of the optical waveguide layer. This makes it possible to achieve a two-dimensional scan. Even in a case where a two-dimensional scan is performed, it is not necessary to cause the refractive index or thickness of each of a plurality of the optical waveguide layers or the wavelength of light to vary by a different amount. That is, a two-dimensional scan can be performed by giving an appropriate phase difference to lights that are supplied to the plurality of optical waveguide layers and causing at least one of the refractive index of each of the plurality of optical waveguide layers, the thickness of each of the plurality of optical waveguide layers, or the wavelength to vary by the same amount in synchronization. In this way, an embodiment of the present disclosure makes it possible to achieve an optical two-dimensional scanning through a comparatively simple configuration.

The phrase "at least one of the refractive index, the thickness, or the wavelength" herein means at least one selected from the group consisting of the refractive index of an optical waveguide layer, the thickness of an optical waveguide layer, and the wavelength of light that is inputted to an optical waveguide layer. For a change in direction of emission of light, any one of the refractive index, the thickness, and the wavelength may be controlled alone. Alternatively, the direction of emission of light may be changed by controlling any two or all of these three. In each of the following embodiments, the wavelength of light that is inputted to the optical waveguide layer may be controlled instead of or in addition to controlling the refractive index or the thickness.

The foregoing fundamental principles are similarly applicable to uses in which optical signals are received as well as uses in which light is emitted. The direction of light that can be received can be one-dimensionally changed by changing at least one of the refractive index, the thickness, or the wavelength. Furthermore, the direction of light that can be received can be two-dimensionally changed by changing a phase difference of light through a plurality of phase shifters connected separately to each of a plurality of unidirectionally-arrayed optical waveguide elements.

An optical scan device and an optical receiver device according to an embodiment of the present disclosure may be used, for example, as an antenna in a photodetection system such as a LiDAR (light detection and raging) system. The LiDAR system, which involves the use of short-wavelength electromagnetic waves (visible light, infrared radiation, or ultraviolet radiation), can detect a distance distribution of objects with higher resolution than a radar system that involves the use of radio waves such as millimeter waves. Such a LiDAR system is mounted, for example, on a movable body such as an automobile, a UAV (unmanned aerial vehicle, i.e. a drone), or an AGV (automated guided vehicle), and may be used as one of the crash avoidance technologies. The optical scan device and the optical receiver device are herein sometimes collectively referred to as "optical device". Further, a device that is used in the optical scan device or the optical receiver device is sometimes referred to as "optical device", too.

The phrase "shape of a light beam" herein means the "shape and/or spread angle of a light beam".

Example Configuration of Optical Scan Device

The following describes, as an example, a configuration of an optical scan device that performs a two-dimensional scan. Note, however, that an unnecessarily detailed description may be omitted. For example, a detailed description of a matter that is already well known and a repeated description of substantially the same configuration may be omitted. This is intended to facilitate understanding of persons skilled in the art by avoiding making the following description unnecessarily redundant. It should be noted that the inventors provide the accompanying drawings and the following description for persons skilled in the art to fully understand the present disclosure and do not intend to limit the subject matter recited in the claims. In the following description, identical or similar constituent elements are given the same reference numerals.

In the present disclosure, the term "light" means electromagnetic waves including ultraviolet radiation (ranging from approximately 10 nm to approximately 400 nm in wavelength) and infrared radiation (ranging from approximately 700 nm to approximately 1 mm in wavelength) as well as visible light (ranging approximately 400 nm to approximately 700 nm in wavelength). Ultraviolet radiation is herein sometimes referred to as "ultraviolet light", and infrared radiation is herein sometimes referred to as "infrared light".

In the present disclosure, an optical "scan" means changing the direction of light. A "one-dimensional scan" means changing the direction of light along a direction that intersects the direction. A "two-dimensional scan" means two-dimensionally changing the direction of light along a plane that intersects the direction.

When it is said herein that two directions are "parallel" to each other, it not only means that they are strictly parallel to each other but also encompasses a configuration in which they form an angle of 15 s or smaller. When it is said herein that two directions are "perpendicular" to each other, it does not mean that they are strictly perpendicular to each other but encompasses a configuration in which they form an angle of 75 degrees or larger and 105 degrees or smaller.

FIG. 1 is a perspective view schematically showing a configuration of an optical scan device 100 according to an exemplary embodiment of the present disclosure. The optical scan device 100 includes an optical waveguide array including a plurality of optical waveguide elements 10. Each of the plurality of optical waveguide elements 10 has a shape extending in a first direction (in FIG. 1, an X direction). The plurality of optical waveguide elements 10 are regularly arrayed in a second direction (in FIG. 1, a Y direction) that intersects the first direction. The plurality of optical waveguide elements 10, while propagating light in the first direction, emit the light in a third direction D3 that intersects an imaginary plane parallel to the first and second directions. Although, in the present embodiment, the first direction (X direction) and the second direction (Y direction) are orthogonal to each other, they do not need to be orthogonal to each other. Although, in the present embodiment, the plurality of optical waveguide elements 10 are placed at equal spacings in the Y direction, they do not necessarily need to be arranged at equal spacings.

It should be noted that the orientation of a structure shown in a drawing of the present disclosure is set in view of understandability of explanation and is in no way intended to restrict the orientation in which an embodiment of the present disclosure is carried out in actuality. Further, the shape and size of the whole or a part of a structure shown in a drawing are not intended to restrict an actual shape and size.

Each of the plurality of optical waveguide elements 10 has first and second mirrors 30 and 40 (each hereinafter sometimes referred to simply as "mirror") facing each other and an optical waveguide layer 20 located between the mirror 30 and the mirror 40. Each of the mirrors 30 and 40 has a specular surface, situated at the interface with the optical waveguide layer 20, that intersects the third direction D3. The mirror 30, the mirror 40, and the optical waveguide layer 20 have shapes extending in the first direction (X direction).

A plurality of the first mirrors 30 of the plurality of optical waveguide elements 10 may be a plurality of portions of a mirror of integral construction. Further, a plurality of the second mirrors 40 of the plurality of optical waveguide elements 10 may be a plurality of portions of a mirror of integral construction. Furthermore, a plurality of the optical waveguide layers 20 of the plurality of optical waveguide elements 10 may be a plurality of portions of an optical waveguide layer of integral construction. A plurality of optical waveguides can be formed by at least (1) each first mirror 30 being constructed separately from another first mirror 30, (2) each second mirror 40 being constructed separately from another second mirror 40, or (3) each optical waveguide layer 20 being constructed separately from another optical waveguide layer 20. The phrase "being constructed separately" encompasses not only physically providing space but also separating first mirrors 30, second mirrors 40, or optical waveguide layers 20 from each other by placing a material of a different refractive index between them.

The specular surface of the first mirror 30 and the specular surface of the second mirror 40 face each other substantially in a parallel fashion. Of the two mirrors 30 and 40, at least the first mirror 30 has the property of transmitting a portion of light propagating through the optical waveguide layer 30. In other words, the first mirror 30 has a higher light transmittance against the light than the second mirror 40. For this reason, a portion of light propagating through the optical waveguide layer 20 is emitted outward from the first mirror 30. Such mirrors 30 and 40 may for example be multilayer mirrors that are formed by multilayer films of dielectrics (sometimes referred to as "multilayer reflective films").

An optical two-dimensional scan can be achieved by controlling the phases of lights that are inputted to the respective optical waveguide elements 10 and, furthermore, causing the refractive indices or thicknesses of the optical waveguide layers 20 of these optical waveguide elements 10 or the wavelengths of lights that are inputted to the optical waveguide layers 20 to simultaneously change in synchronization.

In order to achieve such a two-dimensional scan, the inventors conducted an analysis on the principle of operation of an optical waveguide element 10. As a result of their analysis, the inventors succeeded in achieving an optical two-dimensional scan by driving a plurality of optical waveguide elements 10 in synchronization.

As shown in FIG. 1, inputting light to each optical waveguide element 10 causes light to exit the optical waveguide element 10 through an exit surface of the optical waveguide element 10. The exit face is located on the side opposite to the specular surface of the first mirror 30. The direction D3 of the emitted light depends on the refractive index and thickness of the optical waveguide layer and the wavelength of light. In the present embodiment, at least one of the refractive index of each optical waveguide layer, the thickness of each optical waveguide layer, or the wavelength is controlled in synchronization so that lights that are emitted separately from each optical waveguide element 10 are oriented in substantially the same direction. This makes it possible to change X-direction components of the wave number vectors of lights that are emitted from the plurality of optical waveguide elements 10. In other words, this makes it possible to change the direction D3 of the emitted light along a direction 101 shown in FIG. 1.

Furthermore, since the lights that are emitted from the plurality of optical waveguide elements 10 are oriented in the same direction, the emitted lights interfere with one another. By controlling the phases of the lights that are emitted from the respective optical waveguide elements 10, a direction in which the lights reinforce one another by interference can be changed. For example, in a case where a plurality of optical waveguide elements 10 of the same size are placed at equal spacings in the Y direction, lights differing in phase by a constant amount from one another are inputted to the plurality of optical waveguide elements 10. By changing the phase differences, Y-direction components of the wave number vectors of the emitted lights can be changed. In other words, by varying phase differences among lights that are introduced into the plurality of optical waveguide elements 10, the direction D3, in which the emitted lights reinforce one another by interference, can be changed along a direction 102 shown in FIG. 1. This makes it possible to achieve an optical two-dimensional scan.

The following describes the principle of operation of the optical scan device 100.

Principle of Operation of Optical Waveguide Element

Figure 2:
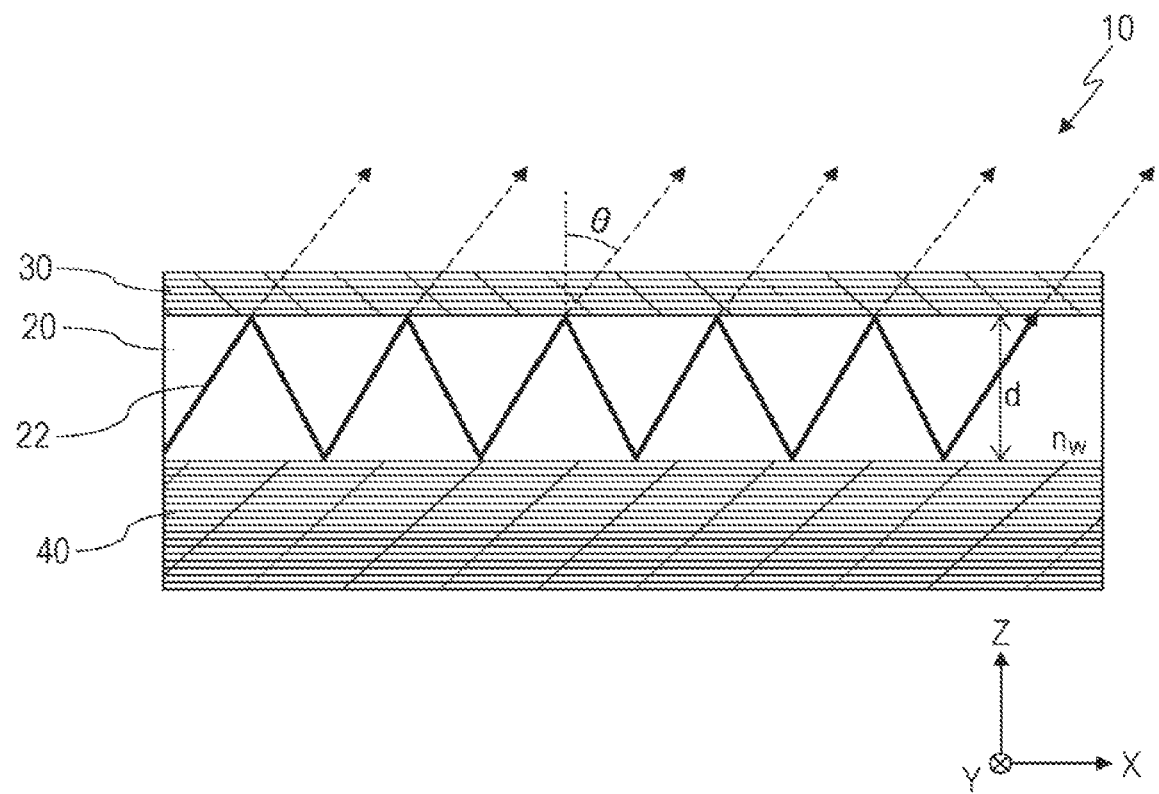
FIG. 2 is a diagram schematically showing an example of a cross-section structure of one optical waveguide element and an example of propagating light.

FIG. 2 is a diagram schematically showing an example of a cross-section structure of one optical waveguide element 10 and an example of propagating light. With a Z direction being a direction perpendicular of the X and Y directions shown in FIG. 1, FIG. 2 schematically shows a cross-section parallel to an XZ plane of the optical waveguide element 10. The optical waveguide element 10 is configured such that the pair of mirrors 30 and 40 are disposed so as to hold the optical waveguide layer 20 therebetween. Light 22 introduced into the optical waveguide layer 20 through one end of the optical waveguide layer 20 in the X direction propagates through the inside of the optical waveguide layer 20 while being repeatedly reflected by the first mirror 30 provided on an upper surface (in FIG. 2, the upper side) of the optical waveguide layer 20 and the second mirror 40 provided on a lower surface (in FIG. 2, the lower side) of the optical waveguide layer 20. The light transmittance of the first mirror 30 is higher than the light transmittance of the second mirror 40. For this reason, a portion of the light can be outputted mainly from the first mirror 30.

In the case of an optical waveguide such as an ordinary optical fiber, light propagates along the optical waveguide while repeating total reflection. On the other hand, in the case of an optical waveguide element 10 according to the present embodiment, light propagates while being repeatedly reflected by the mirrors 30 and 40 disposed above and below, respectively, the optical waveguide layer 20. For this reason, there are no restrictions on angles of propagation of light. The term "angle of propagation of light" here means an angle of incidence on the interface between the mirror 30 or 40 and the optical waveguide layer 20. Light falling on the mirror 30 or 40 at an angle that is closer to the perpendicular can be propagated, too. That is, light falling on the interface at an angle that is smaller than a critical angle of total reflection can be propagated, too. This causes the group speed of light in the direction of propagation of light to be much lower than the speed of light in free space. For this reason, the optical waveguide element 10 has such a property that conditions for propagation of light vary greatly according to changes in the wavelength of light, the thickness of the optical waveguide layer 20, and the refractive index of the optical waveguide layer 20. Such an optical waveguide is referred to as "reflective optical waveguide" or "slow light optical waveguide".

The angle of emission θ of light that is emitted into the air from the optical waveguide element 10 is expressed by Formula (1) as follows:

$$\sin\theta = \sqrt{n_w^2 - \left(\frac{m\lambda}{2d}\right)^2} \quad (1)$$

As can be seen from Formula (1), the direction of emission of light can be changed by changing any of the wavelength λ of light in the air, the refractive index $n_w$ of the optical waveguide layer 20, and the thickness d of the optical waveguide layer 20.

For example, in a case where $n_w$=2, d=387 nm, λ=1550 nm, and m=1, the angle of emission is 0 degree. Changing the refractive index from this state to $n_w$=2.2 changes the angle of emission to approximately 66 degrees. Meanwhile, changing the thickness to d=420 nm without changing the refractive index changes the angle of emission to approximately 51 degrees. Changing the wavelength to λ=1500 nm without changing the refractive index or the thickness changes the angle of emission to approximately 30 degrees. In this way, the direction of emission of light can be greatly changed by changing any of the wavelength λ of light, the refractive index $n_w$ of the optical waveguide layer 20, and the thickness d of the optical waveguide layer 20.

Accordingly, the optical scan device 100 according to the embodiment of the present disclosure controls the direction of emission of light by controlling at least one of the wavelength λ of light that is inputted to each of the optical waveguide layers 20, the refractive index $n_w$ of each of the optical waveguide layers 20, or the thickness d of each of the optical waveguide layers 20. The wavelength λ of light may be kept constant without being changed during operation. In that case, an optical scan can be achieved through a simpler configuration. The wavelength λ is not limited to a particular wavelength. For example, the wavelength λ may be included in a wavelength range of 400 nm to 1100 nm (from visible light to near-infrared light) within which high detection sensitivity is attained by a common photodetector or image sensor that detects light by absorbing light through silicon (Si). In another example, the wavelength λ may be included in a near-infrared wavelength range of 1260 nm to 1625 nm within which an optical fiber or a Si optical waveguide has a comparatively small transmission loss. It should be noted that these wavelength ranges are merely examples. A wavelength range of light that is used is not limited to a wavelength range of visible light or infrared light but may for example be a wavelength range of ultraviolet light.

In order to change the direction of emitted light, the optical scan device 100 may include a first adjusting element that changes at least one of the refractive index of the optical waveguide layer 20 of each optical waveguide element 10, the thickness of the optical waveguide layer 20 of each optical waveguide element 10, or the wavelength.

As stated above, using an optical waveguide element 10 makes it possible to greatly change the direction of emission of light by changing at least one of the refractive index $n_w$ of the optical waveguide layer 20, the thickness d of the optical waveguide layer 20, or the wavelength λ. This makes it possible to change, to a direction along the optical waveguide element 10, the angle of emission of light that is emitted from the mirror 30. By using at least one optical waveguide element 10, such a one-dimensional scan can be achieved.

In order to adjust the refractive index of at least a part of the optical waveguide layer 20, the optical waveguide layer 20 may contain a liquid crystal material or an electro-optical material. The optical waveguide layer 20 may be sandwiched between a pair of electrodes. By applying the voltage to the pair of electrodes, the refractive index of the optical waveguide layer 20 can be changed.

In order to adjust the thickness of the optical waveguide layer 20, at least one actuator may be connected, for example, to at least either the first mirror 30 or the second mirror 40. The thickness of the optical waveguide layer 20 can be changed by varying the distance between the first mirror 30 and the second mirror 40 through the at least one actuator. When the optical waveguide layer 20 is formed from liquid, the thickness of the optical waveguide layer 20 may easily change.

Principle of Operation of Two-Dimensional Scan

In an optical waveguide array in which a plurality of optical waveguide elements 10 are unidirectionally arrayed, the interference of lights that are emitted from the respective optical waveguide elements 10 brings about a change in direction of emission of light. By adjusting the phases of lights that are supplied separately to each optical waveguide element 10, the direction of emission of light can be changed. The following describes the principles on which it is based.

Figure 3A:
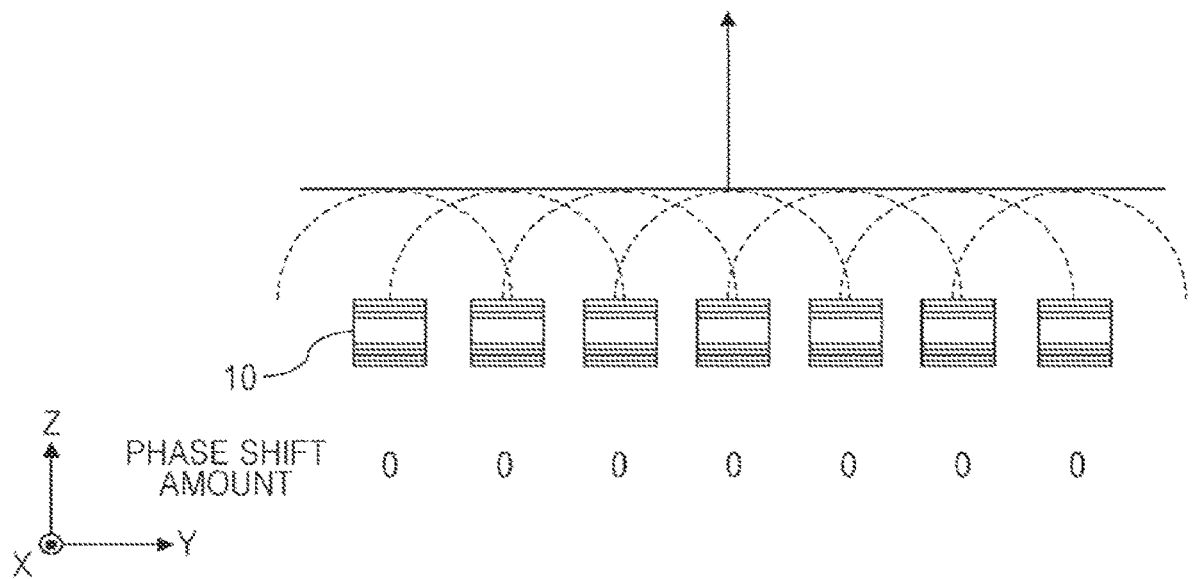
FIG. 3A is a diagram showing a cross-section of an optical waveguide array that emits light in a direction perpendicular to an exit face of the optical waveguide array.

FIG. 3A is a diagram showing a cross-section of an optical waveguide array that emits light in a direction perpendicular to an exit face of the optical waveguide array. FIG. 3A also describes phase shift amounts of lights that propagate separately through each optical waveguide element 10. Note here that the phase shift amounts are values based on the phase of the light that propagates through the leftmost optical waveguide element 10. The optical waveguide array according to the present embodiment includes a plurality of optical waveguide elements 10 arrayed at equal spacings. In FIG. 3A, the dotted circular arcs indicate the wave fronts of lights that are emitted separately from each optical waveguide element 10. The straight line indicates a wave front that is formed by the interference of the lights. The arrow indicates the direction of light that is emitted from the optical waveguide array (i.e. the direction of a wave number vector). In the example shown in FIG. 3A, lights propagating through the optical waveguide layers 20 of each separate optical waveguide element 10 are identical in phase to one another. In this case, the light is emitted in a direction (Z direction) perpendicular to both an array direction (Y direction) of the optical waveguide elements 10 and a direction (X direction) in which the optical waveguide layers 20 extend.

Figure 3B:
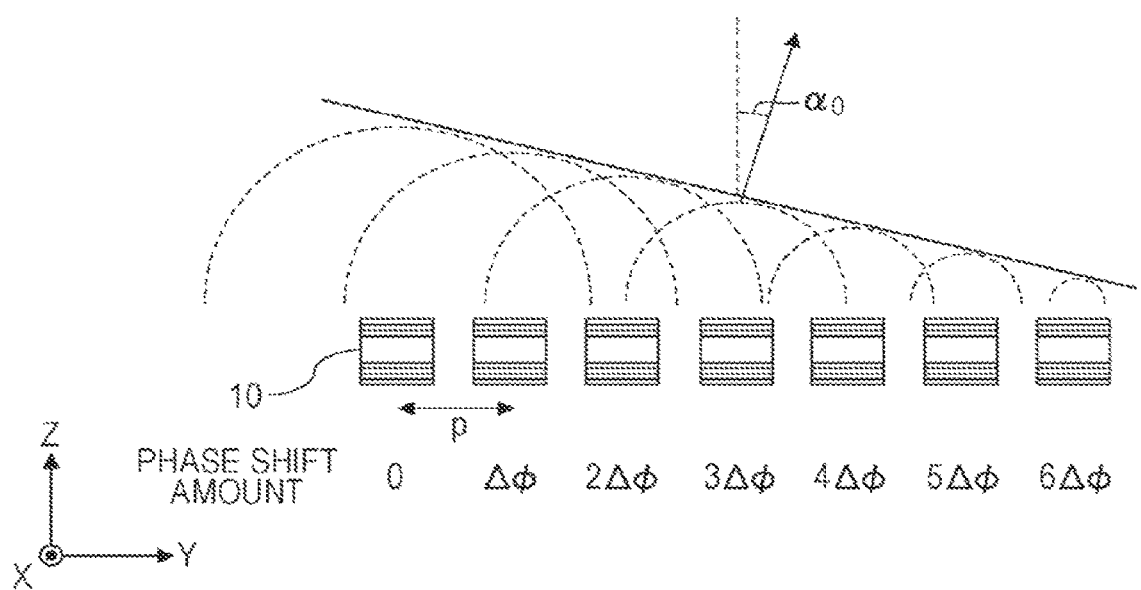
FIG. 3B is a diagram showing a cross-section of an optical waveguide array that emits light in a direction different from a direction perpendicular to an exit face of the optical waveguide array.

FIG. 3B is a diagram showing a cross-section of an optical waveguide array that emits light in a direction different from a direction perpendicular to an exit face of the optical waveguide array. In the example shown in FIG. 3B, lights propagating through the optical waveguide layers 20 of the plurality of optical waveguide elements 10 differ in phase from one another by a constant amount (Δφ) in the array direction. In this case, the light is emitted in a direction different from the Z direction. By varying Δφ, a Y-direction component of the wave number vector of the light can be changed. Assuming that p is the center-to-center distance between two adjacent optical waveguide elements 10, the angle of emission $\alpha_0$ of light is expressed by Formula (2) as follows:

$$\sin \alpha_0 = \frac{\Delta\phi\lambda}{2\pi p} \quad (2)$$

When N is the number of optical waveguide elements 10, the spread angle Δα by which the angle of emission of light spreads is expressed by Formula (3) as follows:

$$\Delta\alpha = \frac{2\lambda}{Np \cos \alpha_0} \quad (3)$$

Accordingly, a larger number of optical waveguide elements 10 can make the spread angle Δα smaller, making it possible to achieve a high-definition optical scan even in a far field.

In the example shown in FIG. 2, the direction of emission of light is parallel to the XZ plane. That is, $\alpha_0=0°$. In each of the examples shown in FIGS. 3A and 3B, the direction of light that is emitted from the optical scan device 100 is parallel to a YZ plane. That is, θ=0°. However, in general, the direction of light that is emitted from the optical scan device 100 is not parallel to the XZ plane or the YZ plane. That is, θ≠0° and $\alpha_0$≠0°.

Figure 4:
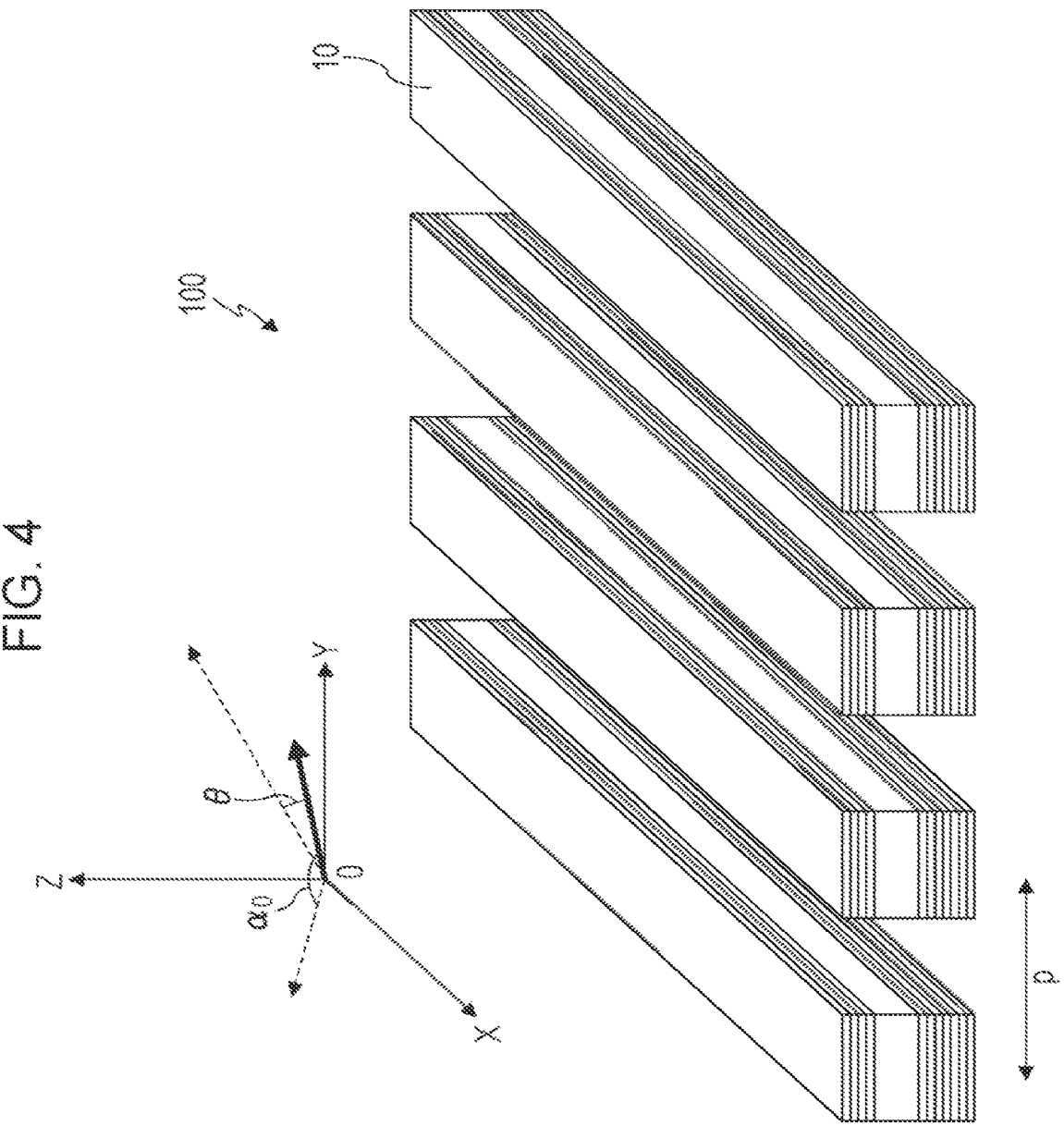
FIG. 4 is a perspective view schematically showing an optical waveguide array in a three-dimensional space.

FIG. 4 is a perspective view schematically showing an optical waveguide array in a three-dimensional space. The bold arrow shown in FIG. 4 represents the direction of light that is emitted from the optical scan device 100. θ is the angle formed by the direction of emission of light and the YZ plane. θ satisfies Formula (1). α0 is the angle formed by the direction of emission of light and the XZ plane. $\alpha_0$ satisfies Formula (2).

Phase Control of Light that is Introduced into Optical Waveguide Array

In order to control the phases of lights that are emitted from the respective optical waveguide elements 10, a phase shifter that changes the phase of light may be provided, for example, at a stage prior to the introduction of light into an optical waveguide element 10. The optical scan device 100 according to the present embodiment includes a plurality of phase shifters connected separately to each of the plurality of optical waveguide elements 10 and a second adjusting element that adjusts the phases of lights that propagate separately through each phase shifter. Each phase shifter includes an optical waveguide joined either directly or via another optical waveguide to the optical waveguide layer 20 of a corresponding one of the plurality of optical waveguide elements 10. The second adjusting element varies differences in phase among lights propagating from the plurality of phase shifters to the plurality of optical waveguide elements 10 and thereby changes the direction (i.e. the third direction D3) of light that is emitted from the plurality of optical waveguide elements 10. As is the case with the optical waveguide array, a plurality of arrayed phase shifters are hereinafter sometimes referred to as "phase shifter array".

Figure 5:
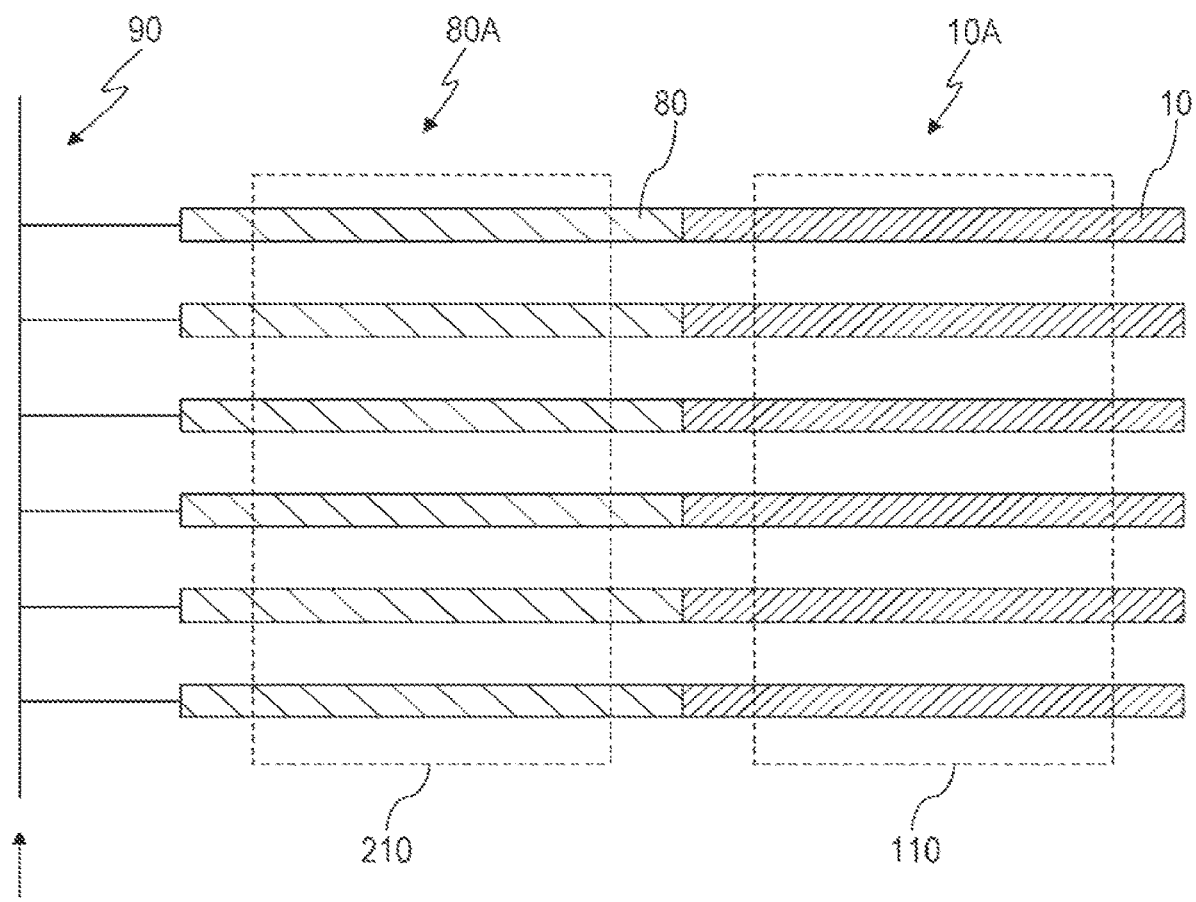
FIG. 5 is a schematic view of an optical waveguide array and a phase shifter array as seen from a direction (Z direction) normal to a light exit face.

FIG. 5 is a schematic view of an optical waveguide array 10A and a phase shifter array 80A as seen from a direction (Z direction) normal to a light exit face. In the example shown in FIG. 5, all phase shifters 80 have the same propagation characteristics, and all optical waveguide elements 10 have the same propagation characteristics. The phase shifter 80 and the optical waveguide elements 10 may be the same in length or may be different in length. In a case where the phase shifters 80 are equal in length, the respective phase shift amounts can be adjusted, for example, by a driving voltage. Further, by making a structure in which the lengths of the phase shifters 80 vary in equal steps, phase shifts can be given in equal steps by the same driving voltage. Furthermore, this optical scan device 100 further includes an optical divider 90 that divides light into lights and supplies the lights to the plurality of phase shifters 80, a first driving circuit 110 that drives each optical waveguide element 10, and a second driving circuit 210 that drives each phase shifter 80. A two-dimensional scan can be achieved by independently controlling the first driving circuit 110 and the second driving circuit 210, which are separately provided. In this example, the first driving circuit 110 functions as one element of the first adjusting element, and the second driving circuit 210 functions as one element of the second adjusting element.

The first driving circuit 110 changes at least either the refractive index or thickness of the optical waveguide layer 20 of each optical waveguide element 10 and thereby changes the angle of light that is emitted from the optical waveguide layer 20. The second driving circuit 210 changes the refractive index of the optical waveguide 20a of each phase shifter 80 and thereby changes the phase of light that propagates through the inside of the optical waveguide 20a. The optical divider 90 may be constituted by an optical waveguide through which light propagates by total reflection or may be constituted by a reflective optical waveguide that is similar to an optical waveguide element 10.

The lights divided by the optical divider 90 may be introduced into the phase shifters 80 after the phases of the lights have been controlled, respectively. This phase control may involve the use of, for example, a passive phase control structure based on an adjustment of the lengths of optical waveguides leading to the phase shifters 80. Alternatively, it is possible to use phase shifters that are similar in function to the phase shifters 80 and that can be controlled by electrical signals. The phases may be adjusted by such a method prior to introduction into the phase shifters 80, for example, so that lights of equal phases are supplied to all phase shifters 80. Such an adjustment makes it possible to simplify the control of each phase shifter 80 by the second driving circuit 210.

An optical device that is similar in configuration to the aforementioned optical scan device 100 can also be utilized as an optical receiver device. Details of the principle of operation of the optical device, a method of operation of the optical device, and the like are disclosed in U.S. Patent Application Publication No. 2018/0224709, the disclosure of which is hereby incorporated by reference herein in its entirety.

Control of Direction and Shape of Light Beam that is Emitted from Optical Scan Device The optical scan device 100 scans a physical object by changing the direction of emission of light. A physical object that is present at a short distance may be irradiated with a light beam of a large spot size. Meanwhile, a physical object that is present at a long distance is irradiated with a light beam of a small spot size. The intensity of a light beam reflected off and returning from a physical object at a long distance may decrease due to scattering or attenuation. For this reason, a physical object at a long distance is irradiated with a light beam of a small spot size so that the intensity of a light beam reflected off and returning from the physical object is increased. In this way, the optical scan device 100 may scan a physical object by changing both the direction and shape of a light beam.

A photodetection apparatus called "flash LiDAR" emits diffused laser light and uses an image sensor to detect light reflected off and returning from a physical object. This makes it possible to acquire a distance image of the physical object at once using a publicly-known TOF (time-of-flight) method. However, the flash LiDAR decreases in light intensity due to the diffusion of the laser light. For this reason, it is not easy to accurately measure a distance to a physical object at a long distance.

An optical device including a plurality of laser sources of different spot sizes can accurately measure distances to physical objects at a short distance and a long distance. The optical device irradiates a physical object at a short distance with a light beam of a large spot size and irradiates a physical object at a long distance with a light beam of a small spot size. The optical device uses many laser light sources in order to accurately measure distances to physical objects at a short distance and a long distance. This results in increased cost. Further, the direction of light that is emitted from each laser source is fixed. This results in a narrow scanning range of physical objects.

U.S. Patent Application Publication No. 2016/0245903 discloses an optical beam scan device that mechanically changes both the direction of emission of a light beam and the spot size of a light beam. The device is configured such that the direction of emission of a light beam emitted from a light source is changed by a mechanically-movable mirror reflecting the light beam. Furthermore, the device is configured such that two lenses are disposed in front of the light source and arranged in the direction of emission of light. The spot size of the light beam is changed by an actuator varying the distance between the two lenses. Mechanical modulation such as that which is performed by the device is not very high in modulation rate. Further, a mechanically-movable part easily wears out and may lead to an increase in failure rate of the device.

Based on the foregoing study, the inventors conceived optical scan devices described in the following items.

A photodetection system according to a first item includes: an optical waveguide array, including a plurality of optical waveguides each of which propagates light along a first direction, that emits a light beam, the plurality of optical waveguides being arranged in a second direction that intersects the first direction; a phase shifter array including a plurality of phase shifters connected separately to each of the plurality of optical waveguides; a control circuit that controls a phase shift amount of each of the plurality of phase shifters and/or inputting of light to each of the plurality of phase shifters and thereby controls a direction and shape of the light beam that is emitted from the optical waveguide array; a photodetector that detects the light beam reflected by a physical object; and a signal processing circuit that generates distance distribution data on the basis of output from the photodetector.

This photodetection system makes it possible to, by controlling the phase shift amount of each of the plurality of phase shifters and/or the inputting of the light to each of the plurality of phase shifters, change the direction and shape of the light beam that is emitted from the optical waveguide array. This makes it possible to generate distance distribution data on physical objects that are present at a short distance, a middle distance, and a long distance.

A photodetection system according to a second item is directed to the photodetection system according to the first item, wherein the control circuit is capable of independently changing a first control parameter that controls the direction of the light beam and a second control parameter that controls the shape of the light beam.

This photodetection system makes it possible to, by independently changing the first control parameter and the second control parameter, reduce the number of control signals that control the direction and shape of the light beam.

A photodetection system according to a third item is directed to the photodetection system according to the second item, wherein the phase shift amount of each of the plurality of phase shifters is a sum of a first shift amount and a second shift amount, and the control circuit controls the direction of the light beam by controlling the first control shift amount of each of the plurality of phase shifters and controls the shape of the light beam by controlling the second shift amount of each of the plurality of phase shifters.

This photodetection system brings about the same effect as the photodetection system according to the second item.

A photodetection system according to a fourth item is directed to the photodetection system according to the third item, wherein the second direction is perpendicular to the first direction, the plurality of optical waveguides are arranged at equal spacings in the second direction, the plurality of phase shifters are arranged as equal spacings in the second direction and connected directly to the plurality of optical waveguides, and the control circuit determines the first shift amount of each of the plurality of phase shifters so that the first shift amount varies by a constant amount in an order in which the plurality of phase shifters are arrayed in the second direction.

This photodetection system makes it possible to change, through the operation of the control circuit, a component constituting the direction of the light beam and acting parallel to the second direction.

A photodetection system according to a fifth item is directed to the photodetection system according to the third or fourth item, wherein the control circuit adjusts the second shift amount of each of the plurality of phase shifters and thereby causes the optical waveguide array to emit a light beam having a predetermined spread angle.

This photodetection system makes it possible to control, through the operation of the control circuit, the spread angle of the light beam in the second direction.

A photodetection system according to a sixth item is directed to the photodetection system according to the fifth item, wherein the control circuit determines the second shift amount of each of the plurality of phase shifters on the basis of random numbers.

This photodetection system makes it possible to sufficiently widen the shape of the light beam in the second direction.

A photodetection system according to a seventh item is directed to the photodetection system according to the first item, wherein the plurality of phase shifters are constituted by a plurality of phase shifter groups arranged in the second direction, each of the plurality of phase shifter groups includes one or more phase shifters, and a difference in phase shift amount between two phase shifters at a boundary between adjacent phase shifter groups is different from a difference in phase shift amount between two adjacent phase shifters in one phase shifter group.

This photodetection system causes lights to be emitted in a plurality of directions from the optical waveguide array. The number of the plurality of directions is equal to the number of phase shifter groups.

A photodetection system according to an eighth item is directed to the photodetection system according to the second item, wherein the control circuit controls the direction of the light beam by controlling the phase shift amount of each of the plurality of phase shifters and controls the shape of the light beam by controlling the inputting of the light to each of the plurality of phase shifters.

This photodetection system makes it possible to independently control, through the operation of the control circuit, a component constituting the direction of the light beam and acting parallel to the second direction and the shape of the light beam in the second direction. Control of the inputting of the light to each of the phase shifters can be achieved, for example, by providing an optical switch at a branch point of an optical divider connected to the plurality of phase shifters.

A photodetection system according to a ninth item is directed to the photodetection system according to any of the first to eighth items, wherein each of the plurality of phase shifters includes an optical waveguide connected to a corresponding one of the plurality of waveguides, the optical waveguide is constituted by a material whose refractive index changes when a voltage is applied, and the control circuit changes the phase shift amount by changing the refractive index by applying the voltage to the optical waveguide of each of the plurality of phase shifters.

This photodetection system makes it possible to change the phase shift amount by applying the voltage to each of the plurality of phase shifters.

A photodetection system according to a tenth item is directed to the photodetection system according to the ninth item, further including a pair of electrodes directly or indirectly holding the optical waveguide of each of the plurality of phase shifters therebetween. The optical waveguide of each of the plurality of phase shifters contains a liquid crystal material or an electro-optical material. The control circuit changes the refractive index of the optical waveguide by applying the voltage to the pair of electrodes.

This photodetection system brings about the same effect as the photodetection system according to the ninth item.

A photodetection system according to an eleventh item is directed to the photodetection system according to any of the first to tenth items, wherein each of the plurality of optical waveguides includes a first mirror extending in the first direction, a second mirror facing the first mirror and extending in the first direction, and an optical waveguide layer, located between the first mirror and the second mirror, that propagates light along the first direction, a transmittance of the first mirror is higher than a transmittance of the second mirror, and the light beam is emitted via the first mirror from the plurality of optical waveguides.

In this photodetection system, each of the plurality of optical waveguides is a reflective waveguide. This causes the light beam to be emitted in a direction that intersects a surface on which the optical waveguide array is placed.

A photodetection system according to a twelfth item is directed to the photodetection system according to the eleventh item, further including first and second electrodes directly or indirectly holding the optical waveguide layer therebetween. The optical waveguide layer of each of the plurality of optical waveguides is constituted by a material whose refractive index changes when a voltage is applied. The first electrode includes a plurality of electrode sections arranged in the first direction. The control circuit controls voltages that are applied between the plurality of electrode sections of the first electrode and the second electrode and thereby changes the direction and shape of the light beam that is emitted from the optical waveguide array.

This photodetection system causes the light beam to be emitted from each of the plurality of portions of the optical waveguide layer that overlap the plurality of electrode sections, respectively. This makes it possible to change a component constituting the direction of the light beam that is emitted from the optical waveguide array and acting parallel to the first direction and the shape of the light beam in the first direction.

A photodetection system according to a thirteenth item is directed to the photodetection system according to the twelfth item, wherein the voltages that are applied to the plurality of electrode sections are each a sum of a first voltage and a second voltage, and the control circuit controls the direction of the light beam by controlling the first voltage and controls the shape of the light beam by controlling the second voltage.

This photodetection system makes it possible to independently change a component constituting the direction of the light beam that is emitted from the optical waveguide array and acting parallel to the first direction and the shape of the light beam in the first direction.

A photodetection system according to a fourteenth item is directed to the photodetection system according to the twelfth or thirteenth item, wherein the material whose refractive index changes when a voltage is applied is a liquid crystal material or an electro-optical material.

This photodetection system brings about the same effect as the photodetection system according to the twelfth or thirteenth item.

A photodetection system according to a fifteenth item is directed to the photodetection system according to any of the eleventh to thirteenth items, wherein a spread angle in either one of the first or second directions of the light beam that is emitted from the optical waveguide array is larger than a spread angle in the other one of the first or second directions of the light beam that is emitted from the optical waveguide array, and the control circuit controls the direction of the light beam so that the light beam is passed in one of the first and second directions that is smaller in spread angle.

This photodetection system makes it possible to scan a predetermined area in its entirety by shifting, in a one-dimensional direction, a light beam emitted from the optical waveguide array.

A photodetection system according to a sixteenth item includes: an optical scan device that is capable of controlling a direction and shape of a light beam; an image sensor, having a plurality of pixels, that detects the light beams reflected by a physical object; and a signal processing circuit that generates distance distribution data on the basis of output from the image sensor. The optical scan device irradiates, with the light beam having a first spread angle, a first area in a scene that the image sensor shoots and irradiates, with the light beam having a second spread angle that is larger than the first spread angle, a second area in the scene that is at a shorter distance than the first area.

This photodetection system makes it possible to generate distance distribution data on physical objects that are present at different distances.

Embodiment

Figure 6A:
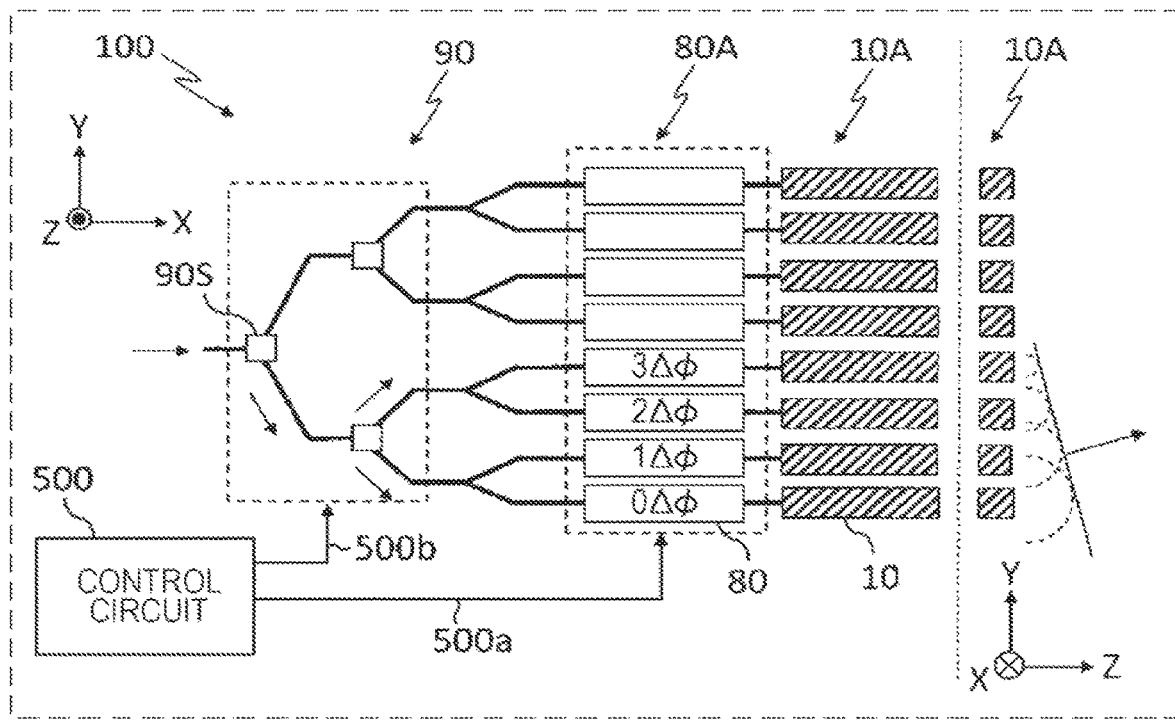
FIG. 6A is a diagram schematically showing an example of an optical scan device according to the present embodiment and an example of the direction of a light beam that is emitted from an optical waveguide array.
Figure 6B:
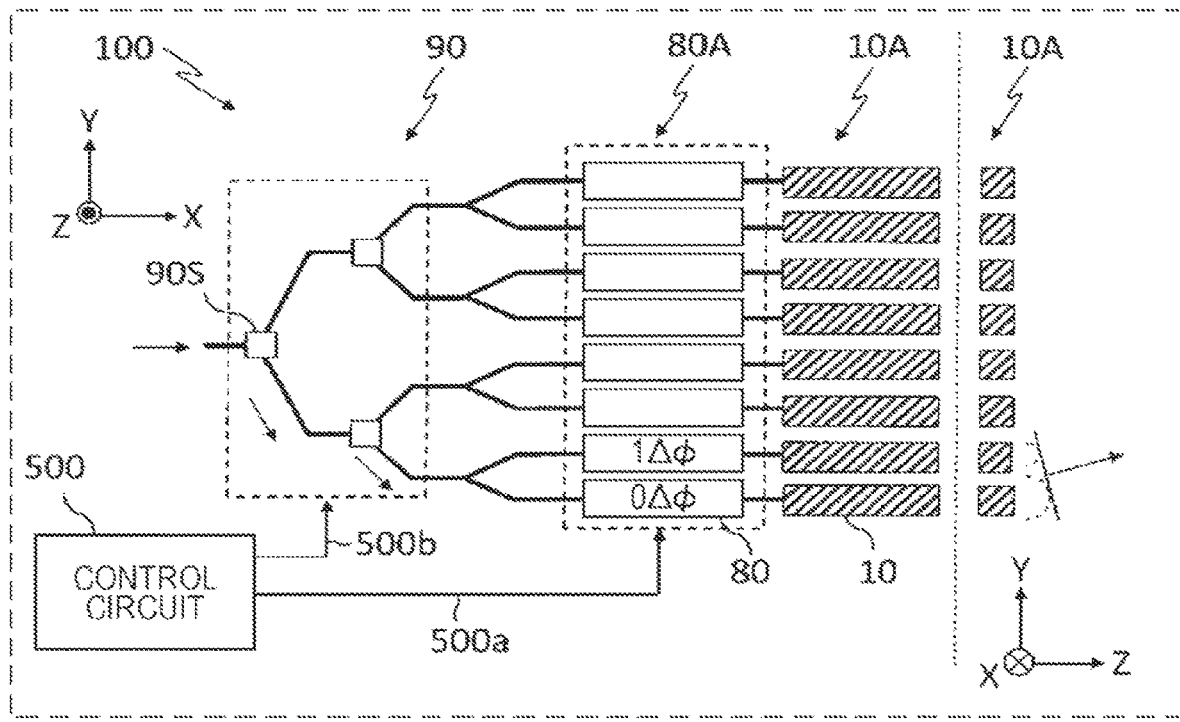
FIG. 6B is a diagram schematically showing an example of the optical scan device according to the present embodiment and an example of the direction of the light beam that is emitted from the optical waveguide array.

FIGS. 6A and 6B are diagrams each schematically showing an example of an optical scan device 100 according to the present embodiment and an example of the direction of a light beam that is emitted from an optical waveguide array 10A. The drawing on the left side of the vertical dashed line is a drawing schematically showing an example of the optical scan device 100 on an XY plane. The drawing on the right side of the vertical dashed line is a drawing schematically showing the direction in a YZ plane of a light beam that is emitted from the optical waveguide array 10A. The same applies to the following drawings. Optical waveguide elements 10 are hereinafter sometimes referred to simply as "optical waveguides 10".

In each of the examples shown in FIGS. 6A and 6B, the optical scan device 100 includes an optical waveguide array 10A, a phase shifter array 80A, an optical divider 90, and a control circuit 500.

The optical waveguide array 10A includes a plurality of optical waveguides 10 each of which propagates light along the X direction. The plurality of optical waveguides 10 are arranged in the Y direction and emit a light beam in a direction that intersects the XY plane. In each of the examples shown in FIGS. 6A and 6B, the plurality of optical waveguides 10 are arranged in the Y direction, which is perpendicular to the X direction.

The phase shifter array 80A includes a plurality of phase shifters 80 connected separately to each of the plurality of optical waveguides 10. The plurality of phase shifters 80A are arranged at equal spacings in the Y direction, which is perpendicular to the X direction, and connected directly to the plurality of optical waveguides 10. Each of the plurality of phase shifters 80A includes an optical waveguide connected to a corresponding one of the plurality of optical waveguides 10. The optical waveguide is constituted by a material whose refractive index changes when a voltage is applied. In a case where the optical waveguide of each of the plurality of phase shifters 80 contains a liquid crystal material or an electro-optical material, the optical scan device 100 further includes a pair of electrodes directly or indirectly holding the optical waveguide of each of the plurality of phase shifters 80 therebetween.

The liquid crystal material may for example be nematic liquid crystals. The molecular structure of a nematic liquid crystal is as follows:

R1-Ph1-R2-Ph2-R3 where R1 is any one member selected from the group consisting of an amino group, a carbonyl group, a carboxyl group, a cyano group, an amine group, a nitro group, a nitryl group, and an alkyl chain, R3 is any one member selected from the group consisting of an amino group, a carbonyl group, a carboxyl group, a cyano group, an amine group, a nitro group, a nitryl group, and an alkyl chain, Ph1 is an aromatic group such as a phenyl group or a biphenyl group, Ph2 is an aromatic group such as a phenyl group or a biphenyl group, and R2 is any one member selected from the group consisting of a vinyl group, a carbonyl group, a carboxyl group, a diazo group, and an azoxy group.

The liquid crystals are not limited to nematic liquid crystals. For example, smectic liquid crystals may be used. Among smectic liquid crystals, the liquid crystals may for example be in a smectic C phase (SmC phase). Among smectic C phases (SmC phases), the smectic liquid crystals may for example be in a chiral smectic phase (SmC* phase), i.e. ferroelectric liquid crystals each having a chiral center such as asymmetric carbon within a liquid crystal molecule.

The molecule structure of the SmC* phase is expressed as follows:

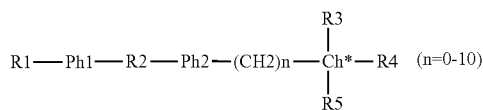

where R1 and R4 are each independently any one member selected from the group consisting of an amino group, a carbonyl group, a carboxyl group, a cyano group, an amine group, a nitro group, a nitryl group, and an alkyl chain, Ph1 is an aromatic group such as a phenyl group or a biphenyl group, Ph2 is an aromatic group such as a phenyl group or a biphenyl group, R2 is any one member selected from the group consisting of a vinyl group, a carbonyl group, a carboxyl group, a diazo group, and an azoxy group, Ch* is a chiral center, which is typically carbon (C*), R3 is any one member selected from the group consisting of hydrogen, a methyl group, an amino group, a carbonyl group, a carboxyl group, a cyano group, an amine group, a nitro group, a nitryl group, and an alkyl chain, R5 is any one member selected from the group consisting of hydrogen, a methyl group, an amino group, a carbonyl group, a carboxyl group, a cyano group, an amine group, a nitro group, a nitryl group, and an alkyl chain, and R3, R4, and R5 are functional groups that are different from one another.

The liquid crystal material may be a mixture of a plurality of liquid crystal molecules that are different in composition from each other. For example, a mixture of nematic liquid crystal molecules and smectic liquid crystal molecules may be used as the material of the optical waveguide layer 20.

The electro-optical material may be any of the following compounds:
  KDP ($KH_2PO_4$) crystal . . . For example, KDP, ADP ($NH_4H_2PO_4$), KDA ($KH_2AsO_4$), RDA ($RbH_2PO_4$), or ADA ($NH_4H_2AsO_4$)
  Cubic system material . . . For example, KTN, $BaTiO_3$, $SrTiO_3Pb_3$, $MgNb_2O_9$, GaAs, CdTe, or InAs
  Tetragonal system material . . . For example, $LiNbO_3$ or $LiTaO_3$
  Zinc blende material . . . For example, ZnS, ZnSe, ZnTe, GaAs, or CuCl
  Tungsten bronze material . . . $KLiNbO_3$, $SrBaNb_2O_6$, KSrNbO, BaNaNbO, or $Ca_2Nb_2O_7$ The optical divider 90 includes one or more optical switches 90S at one or more optical branch points. The optical divider 90 does not need to include optical switches 90S at all optical branch points. The optical switches 90S make it possible to switch between the inputting and blocking of light to each of the plurality of phase shifters 80.

The control circuit 500 controls a phase shift amount $\varphi_i$ of each of the plurality of phase shifters 80 in accordance with a first control signal 500a. The phase shift amount $\varphi_i$ represents a phase shift amount of the ith phase shifter as counted from the bottom. The control circuit 500 changes the phase shift amount by changing the refractive index by applying the voltage to the optical waveguide of each phase shifter 80. In a case where the optical waveguide of each of the plurality of phase shifters 80 contains a liquid crystal material or an electro-optical material, the control circuit 500 can change the refractive index of the optical waveguide of each of the phase shifters 80 by applying the voltage to the pair of electrodes. The control circuit 500 determines the phase shift amount so that as shown in FIGS. 6A and 6B, the phase shift amount $\varphi_i=(i-1)\Delta\varphi$ varies by a constant amount $\Delta\varphi$ in the order in which the phase shifters 80 are arrayed. This makes it possible to control a Y-direction component of the direction of the light beam that is emitted from the optical waveguide array 10A.

The control circuit 500 controls the switching of the optical switches 90S in accordance with a second control signal 500b. As a result, in the example shown in FIG. 6A, the control circuit 500 inputs lights to the lower four phase shifters 80, and in the example shown in FIG. 6B, the control circuit 500 inputs lights to the lower two phase shifters 80. The spread angle of the light beam is expressed by Formula (3), which has been mentioned before. That is, the larger the number N of optical waveguides 10 becomes, the smaller the spread angle of the light beam becomes. Accordingly, the spread angle of the light beam in the example shown in FIG. 6A is smaller than the spread angle of the light beam in the example shown in FIG. 6B. In this way, the control circuit 500 uses the optical switches 90S to control the inputting of the light to each of the plurality of phase shifters 80. This makes it possible to control the shape of the light beam that is emitted from the optical waveguide array 10A.

In each of the examples shown in FIGS. 6A and 6B, the optical switches 90S are used as new constituent elements. Usable examples of the optical switches 90S include Mach-Zehnder interferometers. A Mach-Zehnder interferometer manufactured with a high degree of processing accuracy makes it possible to make the proportion of light propagation of one of the two branches 100% and make the proportion of light propagation of the other branch 0% or to reduce a loss of light resulting from branching. However, it is not easy to stably manufacture such a Mach-Zehnder interferometer.

The following describes an optical scan device 100 that does not involve the use of an optical switch 90S.

Figure 7:
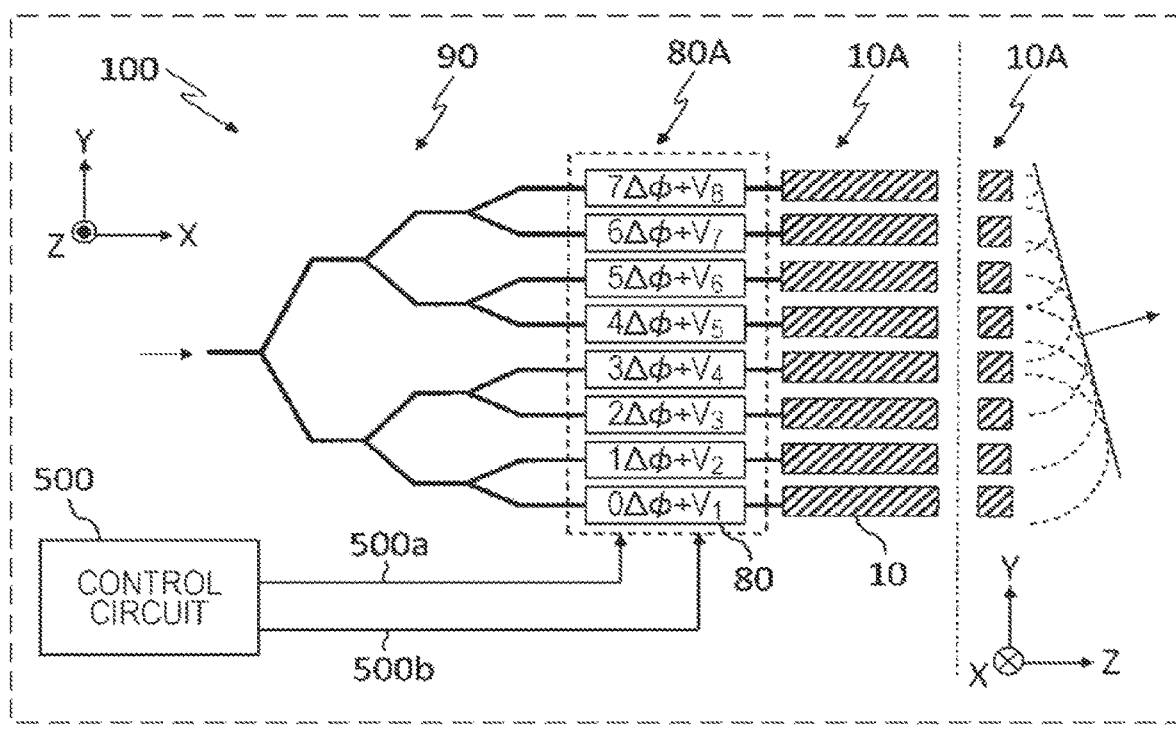
FIG. 7 is a diagram schematically showing an example of the optical scan device according to the present embodiment and an example of the direction of the light beam that is emitted from the optical waveguide array.

FIG. 7 is a diagram schematically showing an example of the optical scan device 100 according to the present embodiment and an example of the direction of the light beam that is emitted from the optical waveguide array 10A.

In the example shown in FIG. 7, the optical scan device 100 includes an optical waveguide array 10A, a phase shifter array 80A, an optical divider 90, and a control circuit 500. The optical waveguide array 10A and the phase shifter array 80A in the example shown in FIG. 7 are identical to the optical waveguide array 10A and the phase shifter array 80A in each of the examples shown in FIGS. 6A and 6B.

In the example shown in FIG. 7, by controlling the phase shift amount of each of the plurality of phase shifters 80, the control circuit 500 controls both the direction and shape of the light beam that is emitted from the optical waveguide array 10A. In the example shown in FIG. 7, the phase shift amount of the ith phase shifter 80 as counted from the bottom is the sum of a first shift amount $\varphi_i$ and a second shift amount $V_i$.

The control circuit 500 controls the direction of the light beam by controlling the first shift amount $\varphi_i$ of the phase shifter 80 in accordance with the first control signal 500a. Specifically, the control circuit 500 determines the phase shift amount so that as shown in FIG. 7, the phase shift amount $\varphi_i=(i-1)\Delta\varphi$ varies by a constant amount $\Delta\varphi$ in the order in which the phase shifters 80 are arrayed. This makes it possible to control a Y-direction component of the direction of the light beam that is emitted from the optical waveguide array 10A.

The control circuit 500 controls the shape of the light beam by controlling the second shift amount $V_i$ of the phase shifter 80 in accordance with the second control signal 500b. The shape of a light beam in a far field is obtained by performing Fourier transformation on a space pattern of the intensity and phase of a light beam just emitted from the optical waveguide array 10A. Based on this principle, the control circuit 500 can determine the second shift amount $V_i$ of the phase shifter 80 according to the desired shape of a light beam in a far field. For example, in sufficiently spreading the shape of a light beam, the control circuit 500 determines the second shift amount $V_i$ of each of the plurality of phase shifters 80 on the basis of random numbers. This randomizes the second shift amount $V_i$.

As shown in FIG. 7, independently controlling the first shift amount $\varphi_i$ and the second shift amount $V_i$ in accordance with the first control signal 500a and the second control signal 500b, respectively, has the following advantage. In a case where the direction and shape of a light beam is controlled in accordance with one control signal, the number of control signals that are stored in a memory (not illustrated) of the control circuit 500 is the product of the number of desired directions of emission and the number of desired shapes. Meanwhile, in a case where the direction and shape of a light beam are independently controlled in accordance with two control signals, the number of control signals that are stored in the memory (not illustrated) of the control circuit 500 is the sum of the number of desired directions of emission and the number of desired shapes. Accordingly, independent control makes it possible to greatly reduce the number of data that represent control signals that are stored in the memory (not illustrated) of the control circuit 500.

Figure 8A:
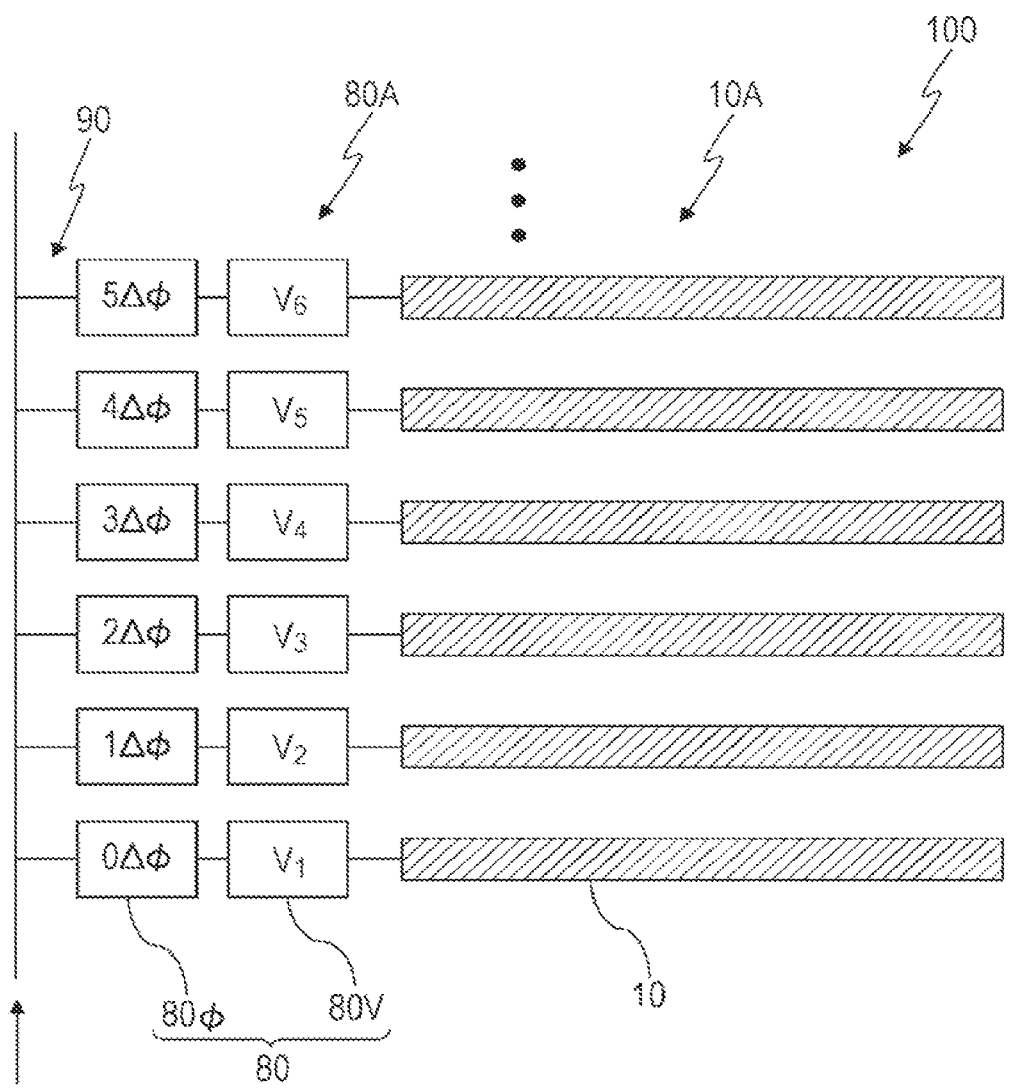
FIG. 8A is a diagram schematically showing a modification of the optical scan device shown in FIG. 7.
Figure 8B:
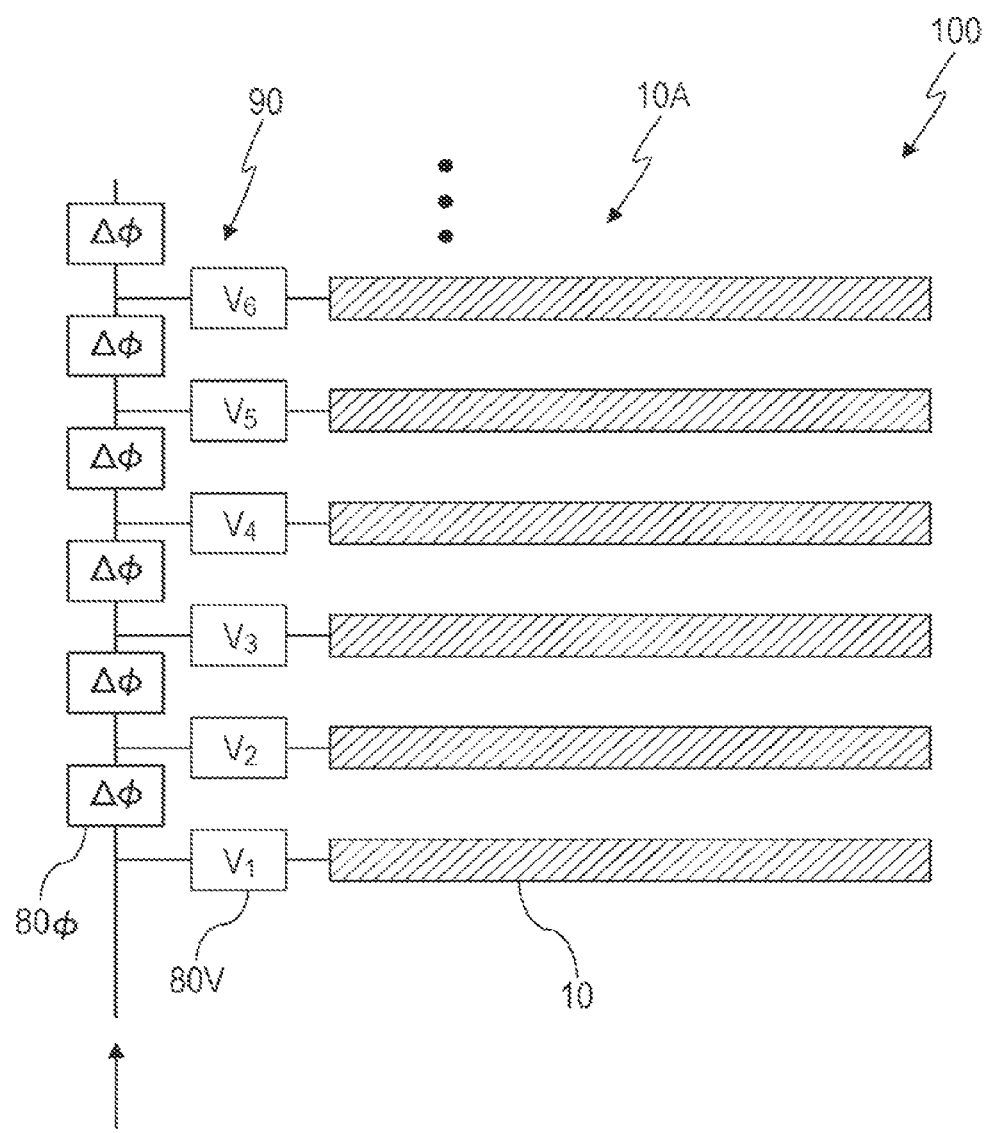
FIG. 8B is a diagram schematically showing a modification of the optical scan device shown in FIG. 7.

FIGS. 8A and 8B are diagrams schematically showing modifications of the optical scan device 100 shown in FIG. 7.

In the example shown in FIG. 8A, each of the plurality of phase shifters 80 is spatially divided into a first phase shifter section 80φ and a second phase shifter section 80V. The first phase shifter section 80φ and the second phase shifter section 80V are connected in series. The second phase shifter section 80V is connected to a corresponding one of the optical waveguides 10. The arrangement of the first phase shifter section 80φ and the second phase shifter section 80V may be inverted.

In the example shown in FIG. 8B, the first phase shifters 80φ of the phase shifters 80 are arranged in a cascade within the optical divider 90. The second phase shifters 80V are connected in series to each separate optical waveguide 10.

In each of the examples shown in FIGS. 8A and 8B, the control circuit 500 controls the first shift amount $\varphi_i$ of the first phase shifter 80φ and controls the second shift amount $V_i$ of the second phase shifter section 80V. As a result, as in the case of the example shown in FIG. 7, light obtained by shifting, by $(i-1)\Delta\varphi+V_i$, the phase of light inputted to the optical divider 90 is inputted to the ith optical waveguide 10 as counted from the bottom.

Next, another example of control of the second shift amount $V_i$ is described.

Figure 9:
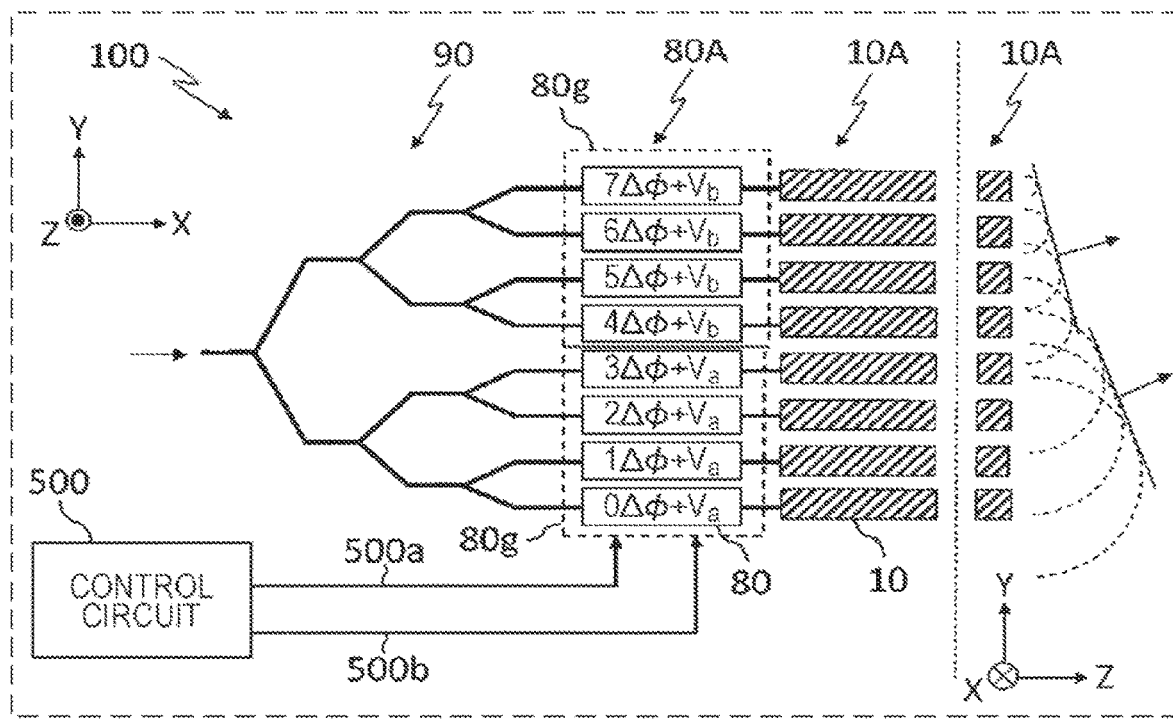
FIG. 9 is a diagram schematically showing an example of the optical scan device according to the present embodiment and an example of the direction of the light beam that is emitted from the optical waveguide array.

FIG. 9 is a diagram schematically showing an example of the optical scan device 100 according to the present embodiment and an example of the direction of the light beam that is emitted from the optical waveguide array 10A. In the example shown in FIG. 9, the plurality of phase shifters 80 includes two phase shifter groups 80g. A first one of the phase shifter groups 80g includes lower four phase shifters, and a second one of the phase shifter groups 80g includes upper four phase shifters. As mentioned above, the control circuit 500 determines the first shift amount $\varphi_i$ in accordance with the first control signal 500a. The control circuit 500 sets second phase shift amounts $V_1$ to $V_4$ to $V_a$ in the first phase shifter group 80g and sets second phase shift amounts $V_5$ to $V_8$ to $V_b$ in the second phase shifter group 80g in accordance with the second control signal 500b. $V_a$ and $V_b$ are different. Light emitted from the lower four optical waveguides 10 via the first phase shifter group 80g interferes with light emitted from the upper four optical waveguides 10 via the second phase shifter group 80. As a result, a light beam outputted from the optical waveguide array 10A splits into two light beams.

Phase shift amounts of light within each separate phase shifter group 80g vary by $\Delta\varphi$ in the order in which the phase shifters are arrayed. Meanwhile, with a focus shifted from one phase shifter group 80g to another adjacent phase shifter group 80g, phase shift amounts of light vary by an amount that is different from $\Delta\varphi$. In the example shown in FIG. 9, the amount that is different from $\Delta\varphi$ is $\Delta\varphi+V_b-V_a$. In other words, the phase shift amount $\Delta\varphi+V_b-V_a$ between two phase shifters at a boundary between adjacent phase shifter groups is different from the phase shift amount $\Delta\varphi$ between two adjacent phase shifters in one phase shifter group.

In summary, the plurality of phase shifters 80 are constituted by a plurality of phase shifter groups 80g arranged in the Y direction. Each of the plurality of phase shifter groups includes one or more phase shifters 80. The control circuit 500 determines the second shift amount $V_i$ so that it varies from one phase shifter group 80g to another.

Figure 10A:
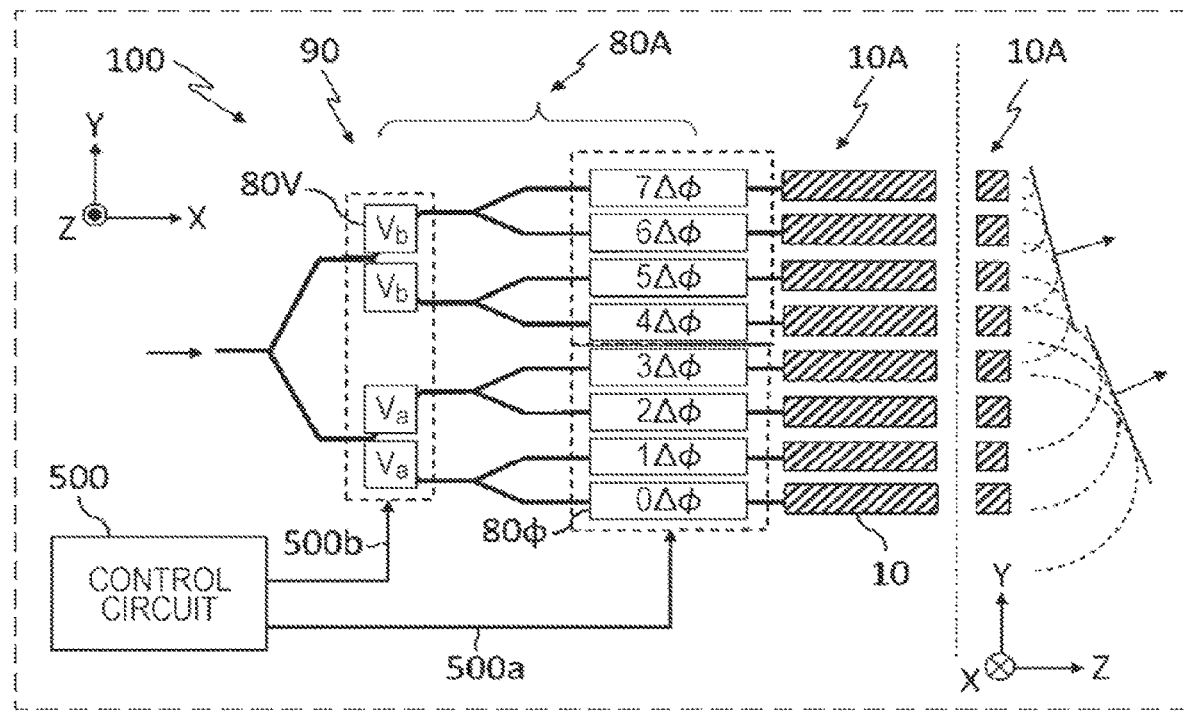
FIG. 10A is a diagram schematically showing a modification of the optical scan device shown in FIG. 9.
Figure 10B:
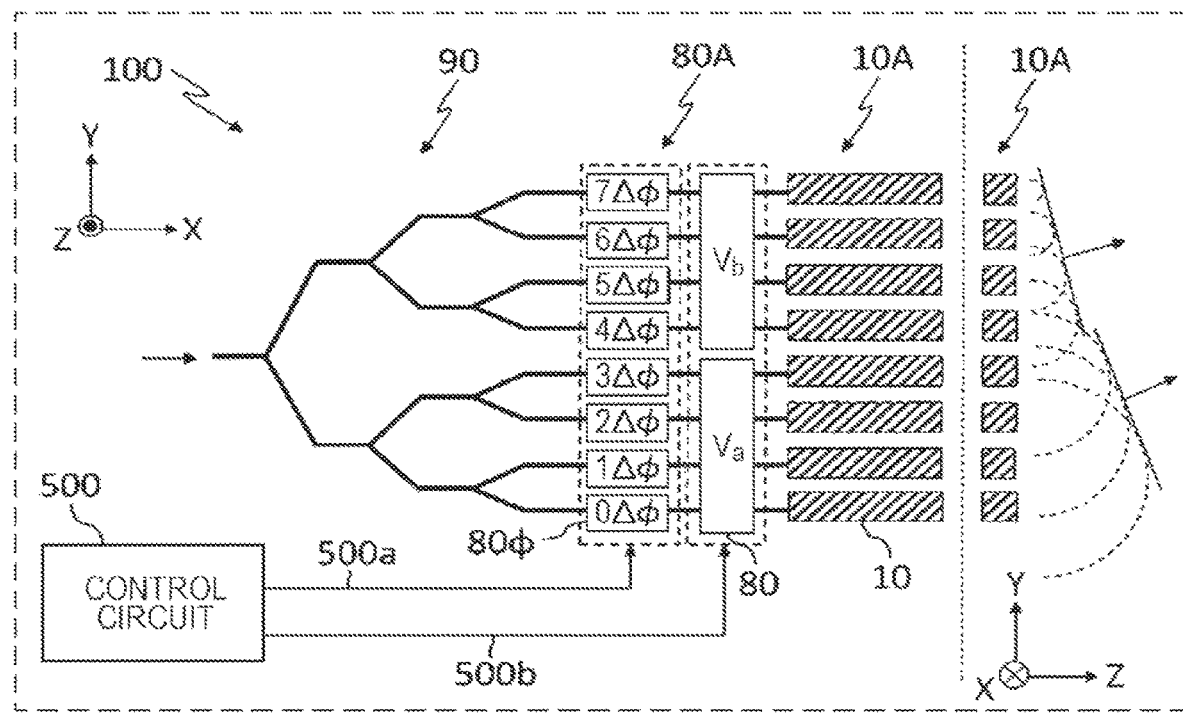
FIG. 10B is a diagram schematically showing a modification of the optical scan device shown in FIG. 9.
Figure 10C:
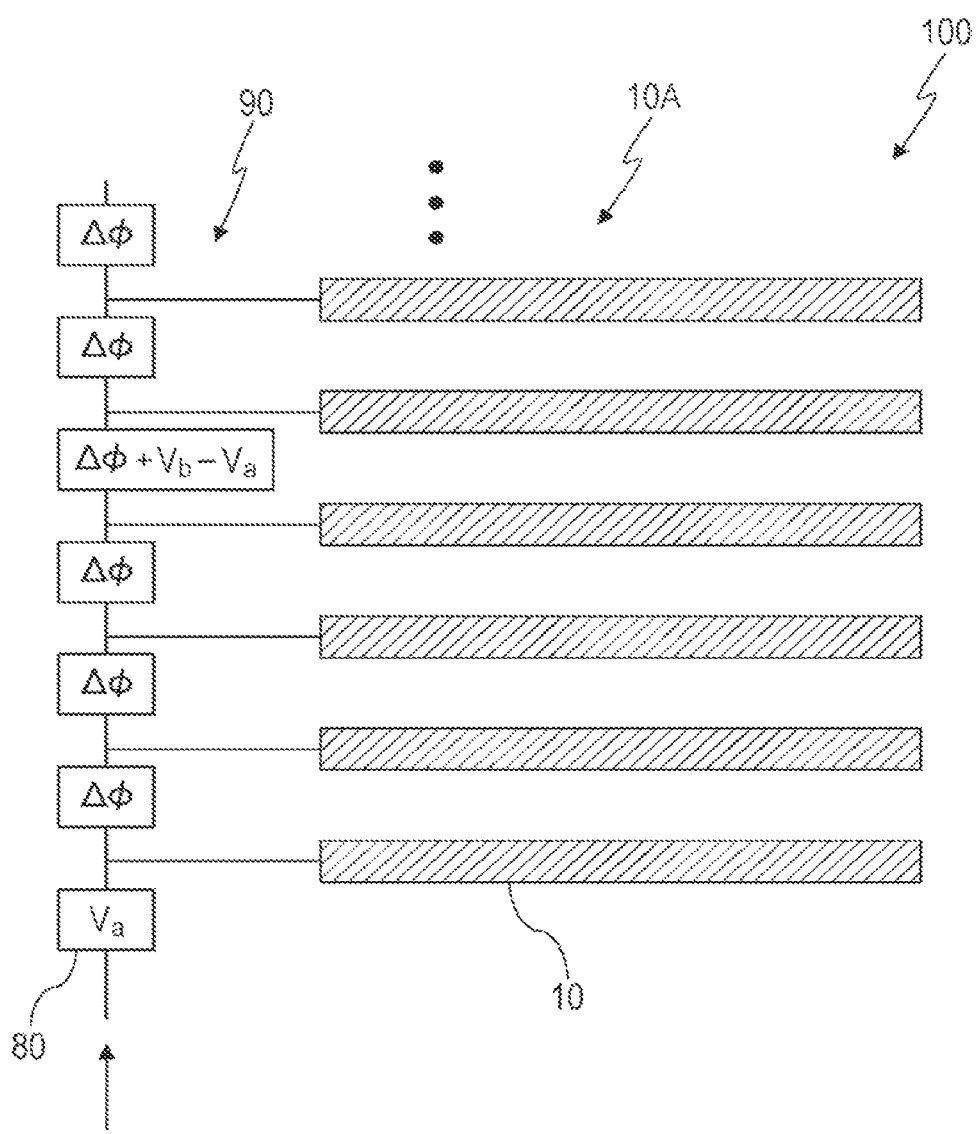
FIG. 10C is a diagram schematically showing a modification of the optical scan device shown in FIG. 9.

FIGS. 10A to 10C are diagrams schematically showing modifications of the optical scan device 100 shown in FIG. 9.

In the example shown in FIG. 10A, the phase shifter array 80A is spatially divided into eight first phase shifter sections 80φ and four second phase shifter sections 80V. In the optical divider 90, one or more branch points are present between a first phase shifter section 80φ and a second phase shifter section 80V. In the example shown in FIG. 10A, the control circuit 500 sets second phase shift amounts to $V_a$ in lower two second phase shifter sections 80V and sets second phase shift amounts to $V_b$ in upper two second phase shifter sections 80V. As a result, the phase of light that is inputted to the optical waveguide array 10A is the same as it is in the example shown in FIG. 9.

In the example shown in FIG. 10B, the phase shifter array 80A is spatially divided into eight first phase shifter sections 80φ and two second phase shifter sections 80V. The arrangement of the eight first phase shifter sections 80φ and the two second phase shifter sections 80V may be inverted. A lower common second phase shifter section 80V is connected to lower four first phase shifter sections 80φ. An upper common second phase shifter section 80V is connected to upper four first phase shifter sections 80φ. In the example shown in FIG. 10A, the control circuit 500 sets second phase shift amounts to $V_a$ in lower two second phase shifter sections 80V and sets second phase shift amounts to $V_b$ in upper two second phase shifter sections 80V. As a result, the phase of light that is inputted to the optical waveguide array 10A is the same as it is in the example shown in FIG. 9.

In the example shown in FIG. 10C, the plurality of phase shifters 80 are arranged in a cascade within the optical divider 90. The control circuit 500 sets the phase shift amount of the lowermost phase shifter 80 to $V_a$, sets the phase shifter amount of the fifth phase shifter 80 as counted from the bottom to $\Delta\varphi+V_b-V_a$, and sets the phase shift amounts of the other phase shifters 80 to $\Delta\varphi$. As a result, the phase of light that is inputted to the optical waveguide array 10A is the same as it is in the example shown in FIG. 9.

Next, a relationship between the first and second shift amounts $\varphi_i$ and $V_i$ and the shape of a light beam in a far field is described with reference to the example shown in FIG. 7.

In the example shown in FIG. 7, the center of the lowermost optical waveguide 10 is located at the origin. In a case where r is the distance between the origin and a place in a far field, the distance $r_i$ between the center of the ith optical waveguide 10 as counted from the bottom and the place in the far field is approximated as $r_i \approx r-(i-1)(p \cdot \sin \alpha_0)$. As shown in FIG. 3B, p is an array cycle of optical waveguides 10 and $\alpha_0$ is an angle of emission of light. $(i-1)(p \cdot \sin \alpha_0)$ is a distance obtained by orthogonally projecting the distance (i−1)p between the origin and the center of the ith optical waveguide 10 onto a line of the distance r connecting the origin with the place in the far field. That is, $r_i$ is approximated by subtracting the orthogonally projected distance $(i-1)(p \cdot \sin \alpha_0)$ from the distance r between the origin and the place in the far field.

For this reason, in a case where $\Delta\varphi(i-1)+V_i$ is added to the phase of light that is inputted to the ith optical waveguide 10 as counted from the bottom, an electric field of light that is emitted from the ith optical waveguide 10 as counted from the bottom is expressed by Formula (4) in the far field as follows:

$$E_j = \left(\frac{\sin b}{b}\right) e^{-j[kr_i+\Delta\phi(i-1)+V_i]} \approx \left(\frac{\sin b}{b}\right) e^{-j[kr-(2a-\Delta\phi)(i-1)+V_j]} \quad (4)$$

where $$a = \frac{2\pi}{\lambda} \frac{p}{2} \sin \alpha_0 \quad (5)$$

$$b = \frac{2\pi}{\lambda} \frac{w}{2} \sin \alpha_0 \quad (6)$$

k is a wave number $2\pi/\lambda$, and w is the width of the optical waveguide 10 in the Y direction. The electric field in the far field is equivalent to the total of electric fields of light emitted from an array number N of optical waveguides 10. Accordingly, the electric field in the far-field is expressed by Formula (7) as follows:

$$E_{total} = \sum_{i=1}^{N} E_i = \left(\frac{\sin b}{b}\right) e^{-jkr} \sum_{i=1}^{N} e^{j[(2a-\Delta\phi)(i-1)-V_j]} \quad (7)$$

A light intensity distribution in the far filed is obtained by the square of the absolute value of $E_{total}$. Accordingly, the light intensity distribution $I(\alpha_0)$ in the far field is expressed by Formula (8) as follows:

$$I(\alpha_0) = |E_{total}|^2 = \left(\frac{\sin b}{b}\right)^2 \left|\sum_{i=1}^{N} e^{j[(2a-\Delta\phi)(i-1)-V_i]}\right|^2 \quad (8)$$

When $V_i=0$, the light intensity distribution $I(\alpha_0)$ is expressed by Formula (9) as follows:

$$I(\alpha_0) = \left(\frac{\sin b}{b}\right)^2 \left|\frac{\sin N(a-\Delta\phi/2)}{\sin(a-\Delta\phi/2)}\right|^2 \quad (9)$$

The light intensity distribution $I(\alpha_0)$ reaches its maximum when $a=\Delta\varphi/2$. This is the same condition as Formula (2), which has been mentioned before.

Figure 11:
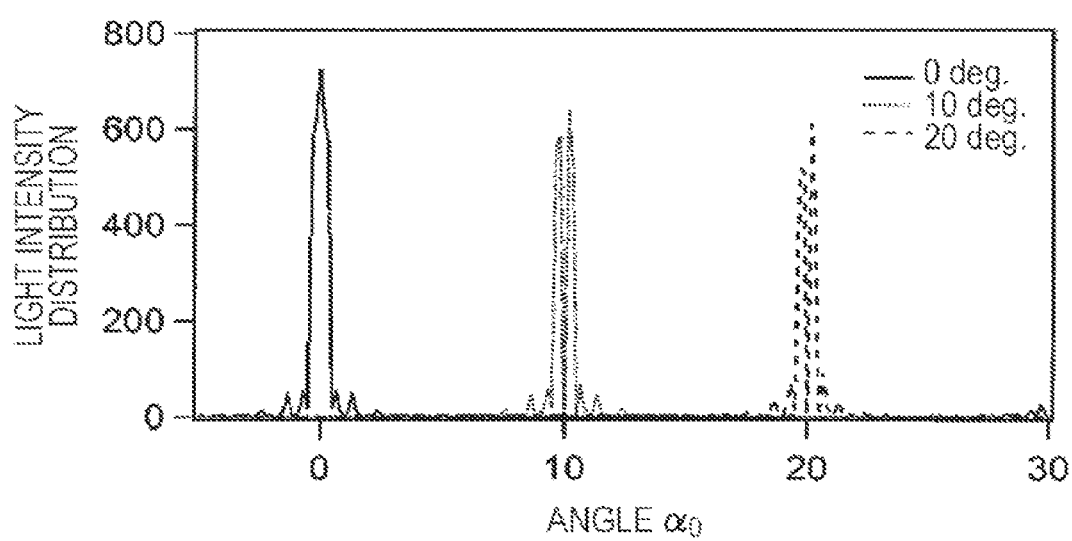
FIG. 11 is a diagram showing a relationship between an angle and a light intensity distribution when a second shift amount is zero.

FIG. 11 is a diagram showing a relationship between the angle $\alpha_0$ and the light intensity distribution $I(\alpha_0)$ when the second shift amount $V_i$ is zero. Wavelength $\lambda=1.55$ μm, Array Cycle p=3 μm, Optical Waveguide Width w=1 μm, and N=32. The solid line, the dotted line, and the dashed line represent results obtained by determining $\Delta\varphi$ at the first shift amount $\varphi_i$ so that $\alpha_0=0°$, $\alpha_0=10°$, and $\alpha_0=20°$, respectively. As shown in FIG. 11, the light intensity distribution $I(\alpha_0)$ indicates a peak at each of $\alpha_0=0°$, $\alpha_0=10°$, and $\alpha_0=20°$. The width of a peak shown in FIG. 11 is equivalent to the spread angle of a light beam.

Figure 12A:
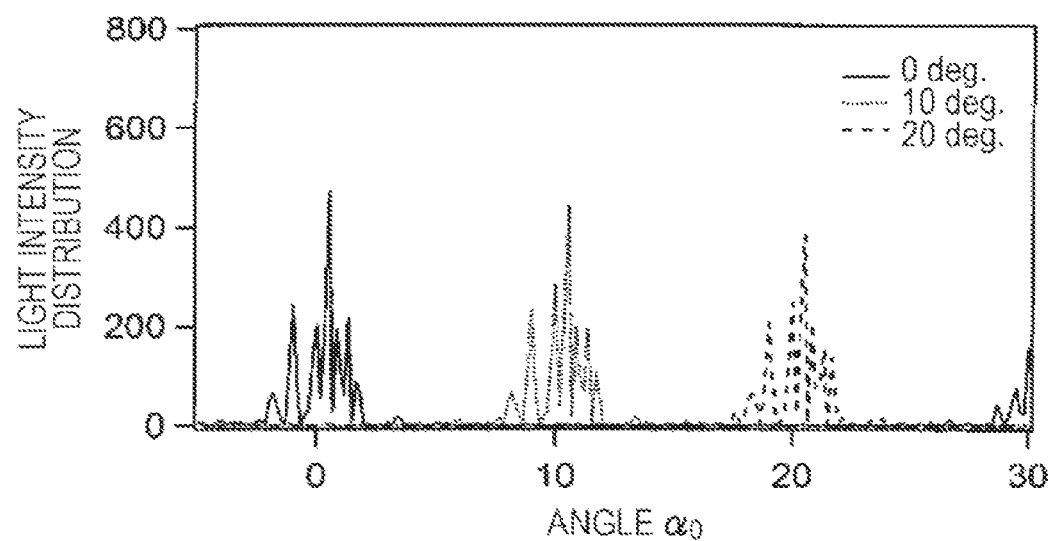
FIG. 12A is a diagram showing a relationship between the angle and the light intensity distribution when the second shift amount is not zero.
Figure 12B:
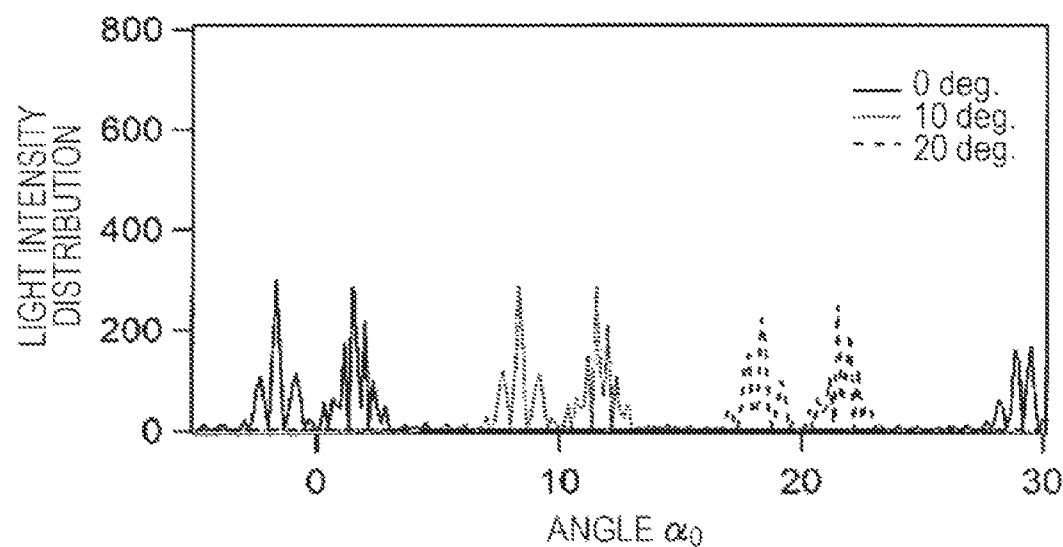
FIG. 12B is a diagram showing a relationship between the angle and the light intensity distribution when the second shift amount is not zero.

FIGS. 12A and 12B are diagrams each showing a relationship between the angle $\alpha_0$ and the light intensity distribution $I(\alpha_0)$ when the second shift amount $V_i$ is not zero. Conditions are the same as those of the example shown in FIG. 11, except for the second shift amount $V_i$. In each of the examples shown in FIGS. 12A and 12B, a phase shifter array 80A whose array number N is equal to 32 includes two phase shifter groups 80g. Each of the two phase shifter groups 80g includes an array number N/2=16 of phase shifters 80.

In the example shown in FIG. 12A, the second shift amount $V_i$ is equal to $0.05\pi$ in a first one of the two phase shifter groups 80g, and the second shift amount $V_i$ is equal to $-0.05\pi$ in a second one of the two phase shifter groups 80g. As shown in FIG. 12A, the light intensity distribution $I(\alpha_0)$ indicates a peak at each of $\alpha_0=0°$, $\alpha_0=10°$, and $\alpha_0=20°$. The width of a peak shown in FIG. 12A is wider than the width of a peak shown in FIG. 11. Meanwhile, the central angle of a peak shown in FIG. 12A is substantially the same as the central angle of a peak shown in FIG. 11.

In the example shown in FIG. 12B, the second shift amount $V_i$ is equal to $0.1\pi$ in a first one of the two phase shifter groups 80g, and the second shift amount $V_i$ is equal to $-0.1\pi$ in a second one of the two phase shifter groups 80g. As shown in FIG. 12B, the light intensity distribution $I(\alpha_0)$ indicates a peak at each of $\alpha_0=0°$, $\alpha_0=10°$, and $\alpha_0=20°$. The peak includes two subpeaks into which it splits, as the phase difference between the two phase shifter groups 80g is great. In this example, the width of the peak is a total of the widths of the two subpeaks. The width of a peak shown in FIG. 12B is wider than the width of a peak shown in FIG. 12A. Meanwhile, the central angle of a peak shown in FIG. 12B is substantially the same as the central angle of a peak shown in FIG. 12A.

Results shown in FIGS. 12A and 12B show that the direction of a light beam is determined by the first shift amount $\varphi_i$ and the spread angle of a light beam is determined by the second shift amount $V_i$. In this way, by adjusting the second shift amount Vi of each phase shifter 80, the control circuit 500 allows the optical waveguide array 10A to emit a light beam having a predetermined spread angle.

Figure 13:
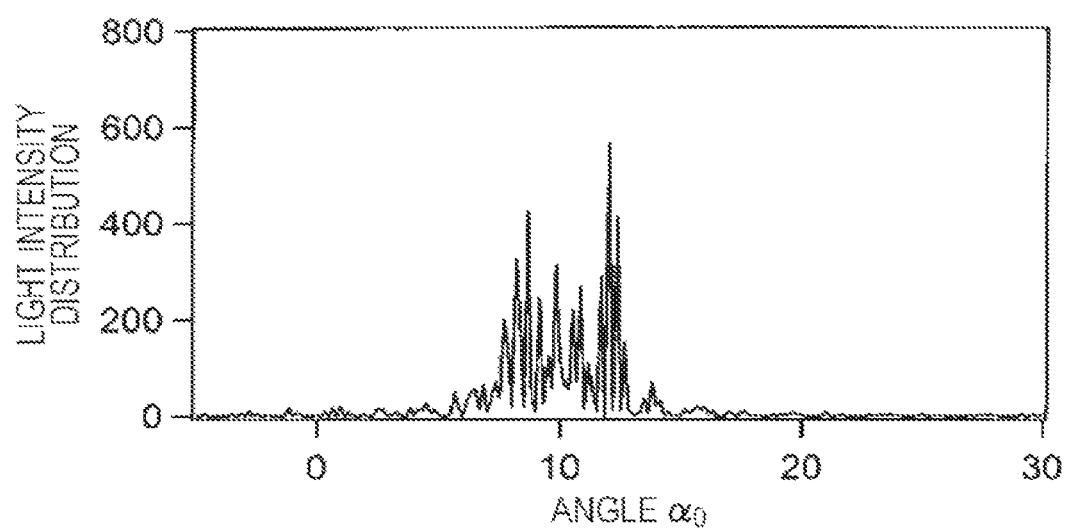
FIG. 13 is a diagram showing a relationship between the angle and the light intensity distribution when the second shift amount is not zero.

FIG. 13 is a diagram showing a relationship between the angle $\alpha_0$ and the light intensity distribution $I(\alpha_0)$ when the second shift amount $V_i$ is not zero and $\Delta\varphi$ at the first shift amount $\varphi_i$ is determined so that $\alpha_0=10°$. In the example shown in FIG. 13, a phase shifter array 80A whose array number N is equal to 64 includes eight phase shifter groups 80g. Each of the eight phase shifter groups 80g includes an array number N/8=8 of phase shifters 80. In the eight phase shifter groups 80g, the second phase shift amounts $V_i$ are equal to $-0.09\pi$, $0.12\pi$, $0.06\pi$, $0\pi$, $0.03\pi$, $-0.1\pi$, $0.06\pi$, $0.09\pi$, respectively. As shown in FIG. 13, the light intensity distribution $I(\alpha_0)$ indicates a peak at $\alpha_0=10°$. Unlike in the example shown in FIG. 12B, the peak does not split into two subpeaks. In this way, by setting discrete second shift amounts $V_i$ for each separate phase shifter group 80g, the peak can be spread without being split. The second shift amounts $V_i$ that are determined for each separate phase shifter group 80g may be determined, for example, on the basis of random numbers. This makes it possible to curb the influence of interference of light between phase shifter groups 80g. This in turn makes it hard for a peak to appear, attaining an uniform intensity distribution of a light beam.

As stated above, the control circuit 500 can independently change a first control parameter that controls the direction of the light beam and a second control parameter that controls the shape of the light beam. In each of the examples shown in FIGS. 6A and 6B, the first control parameter is the phase shift amount $\varphi_i$, and the second control parameter is equivalent of the switching of light input by the optical switch. In each of the examples shown in FIG. 7, FIG. 9, and FIGS. 10A and 10B, the first control parameter is the first shift amount $\varphi_i$, and the second control parameter is the second shift amount $V_i$.

In each of the examples shown in FIGS. 6A to 13, the optical waveguides 10 are not limited to reflective optical waveguides. For example, the optical waveguides 10 may be optical waveguides through which light propagates by total reflection. In a case where such optical waveguides are used as the optical waveguides 10, light is emitted in a direction parallel to the XY plane not from an upper surface of the optical waveguide array 10A but from an end of the optical waveguide array 10A in FIGS. 6A and 6B, FIG. 7, FIG. 9, and FIGS. 10A and 10B.

The aforementioned examples have described the control of a Y-direction component of the direction of a light beam emitted from the optical scan device 100 and the shape of the light beam in the Y direction. The following describes the control of an X-direction component of the direction of a light beam emitted from the optical scan device 100 and the shape of the light beam in the X direction.

Figure 14A:
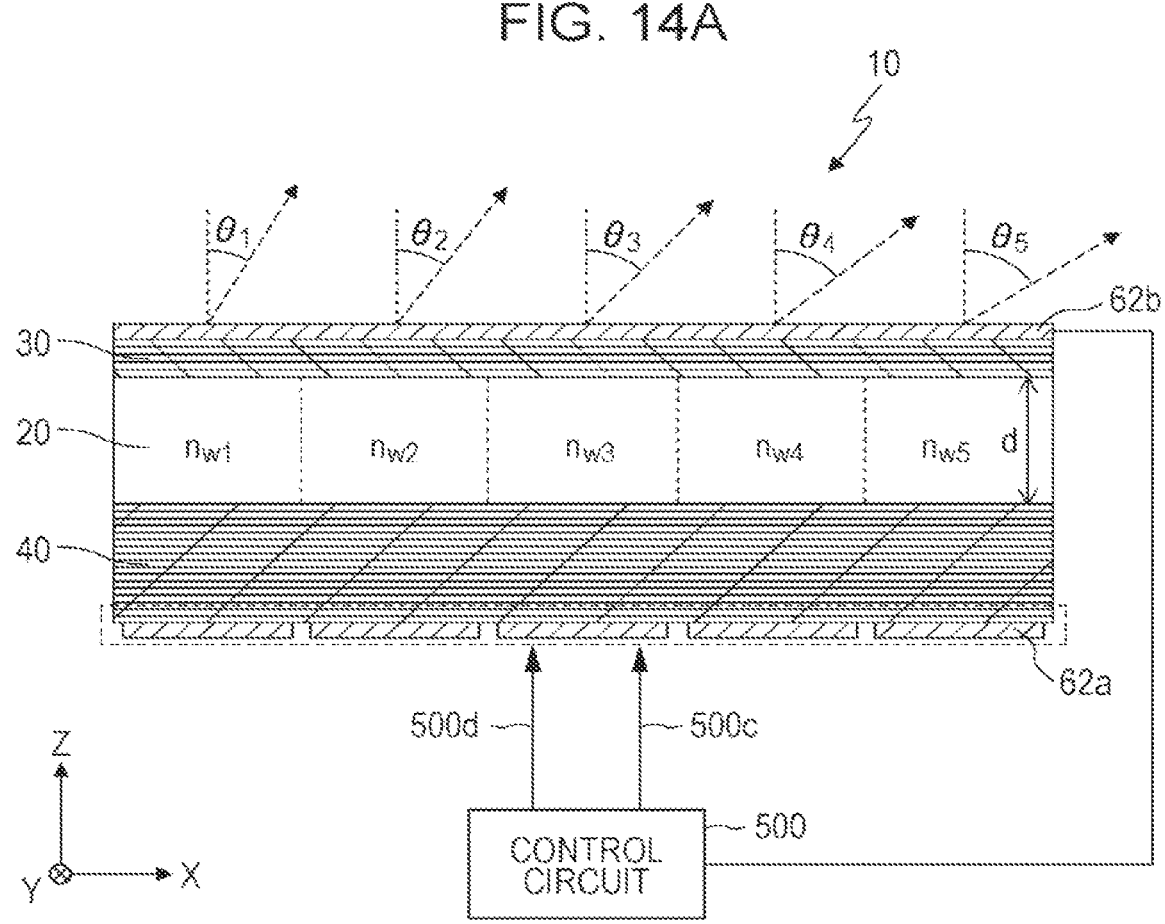
FIG. 14A is a diagram schematically showing an optical waveguide according to the present embodiment.

FIG. 14A is a diagram schematically showing an optical waveguide 10 according to the present embodiment. The optical waveguide 10 includes a first mirror 30, a second mirror 40, an optical waveguide 20, and a pair of electrodes 62a and 62b. The first mirror 30 extends in the X direction. The second mirror 40 faces the first mirror 30 and extends in the X direction. The optical waveguide layer 20 is located between the first mirror 30 and the second mirror 40, and propagates light along the X direction. The transmittance of the first mirror 30 is higher than the transmittance of the second mirror 40. Light that is emitted via the first mirror 30 from the optical waveguide layer 20 of each of a plurality of the optical waveguides 10 interferes. This causes a light beam to be emitted from the optical waveguide array 10A.

In the example shown in FIG. 14A, the optical waveguide layer 20 is constituted by a material whose refractive index changes when a voltage is applied. The optical waveguide layer 20 contains for example a liquid crystal material or an electro-optical material. The pair of electrodes 62a and 62b directly or indirectly holds the optical waveguide layer 20 therebetween. As shown in FIG. 14A, the first mirror 30 may be located between the optical waveguide layer 20 and the upper electrode 62b, and the second mirror 40 may be located between the optical waveguide layer 20 and the lower electrode 62a. In the example shown in FIG. 14A, the lower electrode 62a is a pattern electrode including a plurality of electrode sections arranged in the X direction. Instead of the lower electrode 62a, the upper electrode 62b may be a pattern electrode. Alternatively, in addition to the lower electrode 62a, the upper electrode 62b may be a pattern electrode.

By controlling voltages that are applied between the plurality of electrode sections of the lower electrode 62a and the upper electrode 62, the control circuit 500 can adjust the refractive indices of portions of the optical waveguide layer 20 that overlap the plurality of electrode sections when seen from the Z direction. This allows lights to be emitted via the first mirror 30 in different directions from the portions of the optical waveguide layer 20 that overlap the plurality of electrode sections. This in turn makes it possible to change a X-direction component of the direction of the light beam that is emitted from the optical waveguide array 10A and the shape of the light beam in the X direction. The portions of the optical waveguide layer 20 that overlap the plurality of electrode sections when seen from the Z direction are hereinafter referred to simply as "portions overlapping the plurality of electrode sections".

In the example shown in FIG. 14A, the lower electrode 62a is a pattern electrode including five electrode sections. The application of voltages to the five electrode sections changes the refractive indices $n_{w1}$ to $n_{w5}$ of the portions overlapping the plurality of electrode sections. This also changes the angles of emission $\theta_1$ to $\theta_5$ of lights that are emitted via the first mirror 30 from the portions overlapping the plurality of electrode sections.

Figure 14B:
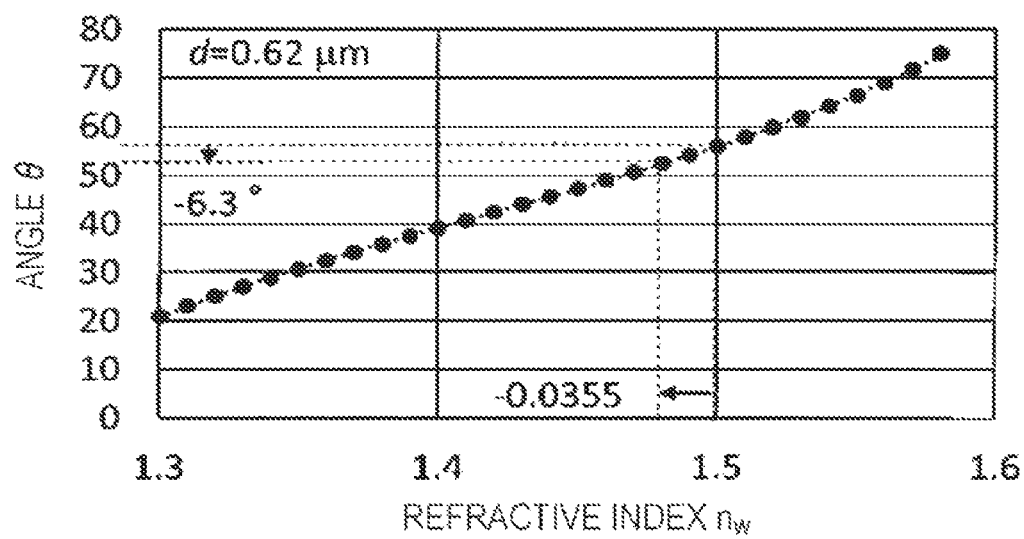
FIG. 14B is a diagram showing a relationship between the refractive index of an optical waveguide layer and the angle of emission of light that is emitted from the optical waveguide.

FIG. 14B is a diagram showing a relationship between the refractive index $n_w$ of the optical waveguide layer 20 and the angle of emission of light that is emitted from the optical waveguide 10. In Formula (1), d=0.62 μm, λ=1.55 μm, and m=1 are used. As shown in FIG. 14B, a change from Refractive Index $n_w=1.5$ by $-0.0355$ causes the angle of emission $\theta$ to decrease by $-6.3$ degrees.

The control circuit 500 may control the direction of the light beam in accordance with a third control signal 500c and control the shape of the light beam in accordance with a fourth control signal 500d. The direction of the light beam is determined, for example, by the average of the angles of emission of lights that are emitted from the portions overlapping the plurality of electrode sections. The shape of the light beam is determined, for example, by the difference between the maximum and minimum values of the angles of emission of lights that are emitted from the portions overlapping the plurality of electrode sections.

In a case where the lower electrode 62a includes M electrode sections, the angles of emission of lights that are emitted via the first mirror 30 from the portions overlapping the plurality of electrode sections are represented as $\theta_1$ to $\theta_M$, respectively. In a case where $\theta$ is the direction of emission of the light beam and $\Delta\theta$ is the spread angle, the refractive index $n_{wj}$ of a portion overlapping the jth electrode section of the M electrode sections in the X direction is adjusted, for example, so that $\theta_j=\theta-(\Delta\theta/2)+\Delta\theta[(j-1)/(M-1)]$. In this case, the maximum value of the angles of emission is given as $\theta_M=\theta+\Delta\theta/2$, and the minimum value is given as $\theta_1=\theta-\Delta\theta/2$. This is not the only combination of $\theta_1$ to $\theta_M$. With the spread angle being $\Delta\theta$, any combination of $\theta_1$ to $\theta_M$ is possible. $\theta_1$ to $\theta_M$ may be set, for example, on the basis of random numbers. For example, the spread angle of a spot of emitted light is given as $\Delta\theta=6.3°$, provided the refractive indices of the plurality of portions of the optical waveguide layer 20 fall within a range of $n_{w1}=1.4645$ to $n_{wM}=1.50$.

From Formula (1), the refractive index $n_w=n_0$ that satisfies the desired angle of emission $\theta$ of the light beam is determined. The voltage that is applied to each of the plurality of electrode sections is the sum of a first voltage and a second voltage. The control circuit 500 applies such a first voltage to each of the plurality of electrode sections in accordance with the third control signal 500c that the refractive indices of the portions overlapping the plurality of electrode sections become $n_0$. The control circuit 500 applies such second voltages to the plurality of electrode sections, respectively, in accordance with the fourth control signal 500d that the refractive indices of the portions overlapping the plurality of electrode sections are corrected to become $n_0$ to $n_{wj}$. In this way, the control circuit 500 controls the direction of the light beam by controlling the first voltage and controls the shape of the light beam by controlling the second voltage. For the same reasons as those mentioned above, independently controlling the direction and shape of a light beam in accordance with two control signals makes it possible to greatly reduce the number of data that represent control signals that are stored in the memory (not illustrated) of the control circuit 500.

As stated above, the optical scan device 100 according to the present embodiment makes it possible to arbitrarily change X-direction and Y-direction components of the direction of the light beam and the shapes of the light beam in the X direction and the Y direction.

Figure 15A:
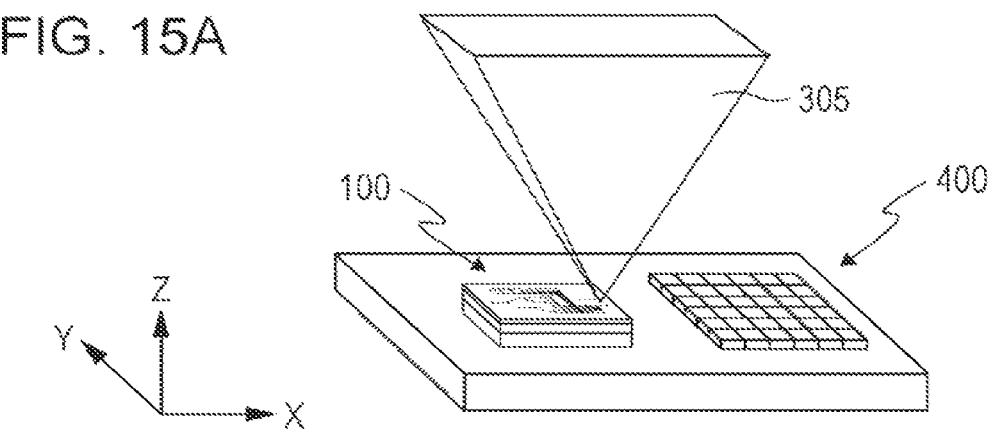
FIG. 15A is a diagram schematically showing an example of the shape of a light beam that is emitted from the optical waveguide array of the optical scan device.
Figure 15B:
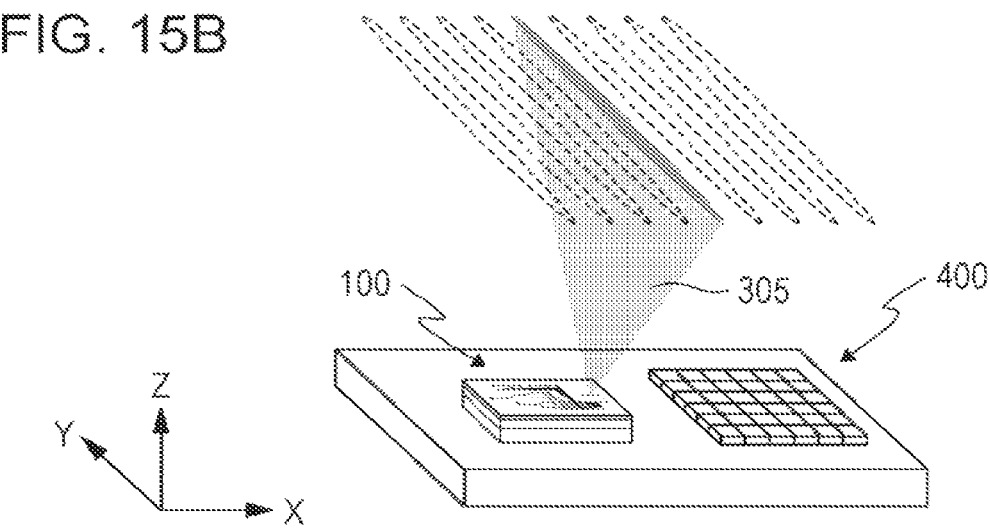
FIG. 15B is a diagram schematically showing an example of the shape of a light beam that is emitted from the optical waveguide array of the optical scan device.
Figure 15C:
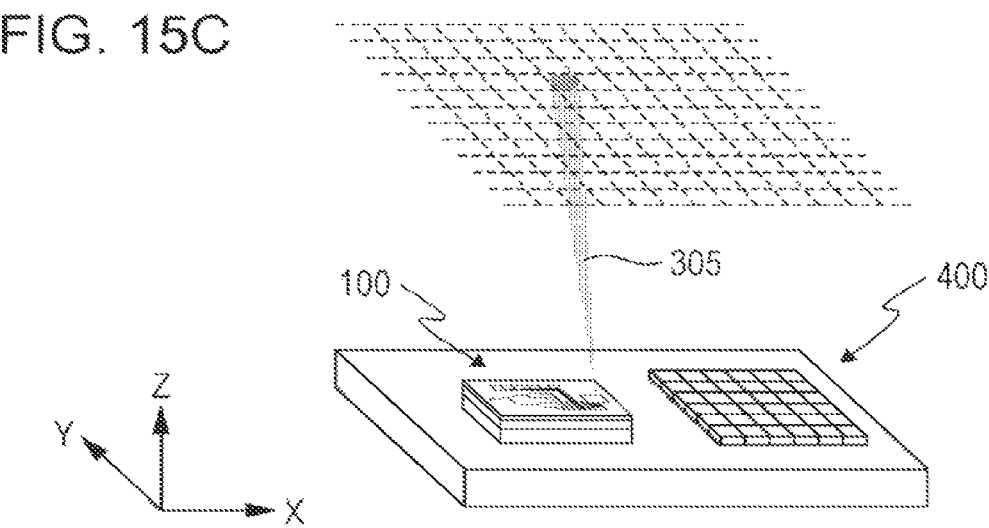
FIG. 15C is a diagram schematically showing an example of the shape of a light beam that is emitted from the optical waveguide array of the optical scan device.

FIGS. 15A to 15C are diagrams each schematically showing an example of the shape of a light beam 305 that is emitted from the optical waveguide array 10A of the optical scan device 100. In each of the examples shown in FIGS. 15A to 15C, the optical scan device 100 and a photodetector 400 are disposed on a substrate. The photodetector 400 is for example an image sensor. Light emitted from the optical waveguide array 10A and reflected off and returning from a physical object is detected by the photodetector 400.

In the example shown in FIG. 15A, the light beam 305 is a diffused beam. The diffused beam has such a spread angle that a target area is covered with one beam. This makes it possible to irradiate a wide range without passing the light beam over it. Meanwhile, the diffused beam has a comparatively short range. For this reason, the diffused beam is used to measure an object at a comparatively short distance.

In the example shown in FIG. 15B, the light beam 305 is a line beam (which is an example of a line scan beam of the present disclosure). The spread angle of the line beam in the Y direction is larger than the spread angle of the line beam in the X direction. While the line beam has such a spread angle that a range of a target area in the Y direction is covered with one beam, a range of the target area in the X direction cannot be covered with one beam. Accordingly, the light beam is passed in the X direction. The relationship in magnitude between the spread angles of the line beam in the X direction and the Y direction may be inverted. Unlike the diffused beam, the line beam is passed in a one-dimensional direction. Meanwhile, the line beam has a longer range than the diffused beam. This makes it possible to measure a physical object at a longer distance. In the case of the line beam, the control circuit 500 controls the direction of the light beam so that the light beam is passed in one of the X and Y directions that is smaller in spread angle.

In the example shown in FIG. 15C, the light beam 305 is a spot beam (which is an example of a two-dimensional scan beam of the present disclosure). The spot beam cannot cover ranges of a target area in both the X direction and the Y direction with one beam. For this reason, the light beam is passed in both the X direction and the Y direction. Unlike the line beam, the spot beam is passed in a two-dimensional direction. Meanwhile, the spot beam has a further longer range than the line beam. This makes it possible to measure a physical object at a further longer distance.

The optical scan device 100 may irradiate, with a light beam having a first spread angle, a first area in a scene that the photodetector 400 shoots and irradiate, with a light beam having a second spread angle that is larger than the first spread angle, a second area in the scene that is located at a shorter distance than the first area. By thus arbitrarily changing the shape of the light beam 305, distances to physical objects at a short distance and a long distance can be accurately measured.

The optical scan device 100 according to the present embodiment also brings about the following effects.

Conventionally, there has been known a method for measuring a distance to a physical object by emitting lights in different directions from a plurality of light sources and detecting, through an image sensor, light reflected off and returning from the physical object. This method irradiates a physical object with lights emitted in different directions from the plurality of light sources. This causes parallax differences that lead to differences in location of the shadow of the physical object to be detected. As a result, it is not easy to reconstruct one distance image by integrating distance images of the physical object as acquired from the plurality of light sources, respectively.

Meanwhile, the optical scan device 100 according to the present embodiment is configured such that a light beam of a given shape is emitted in a given direction from one device. Accordingly, there are no parallax differences.

Figure 16:
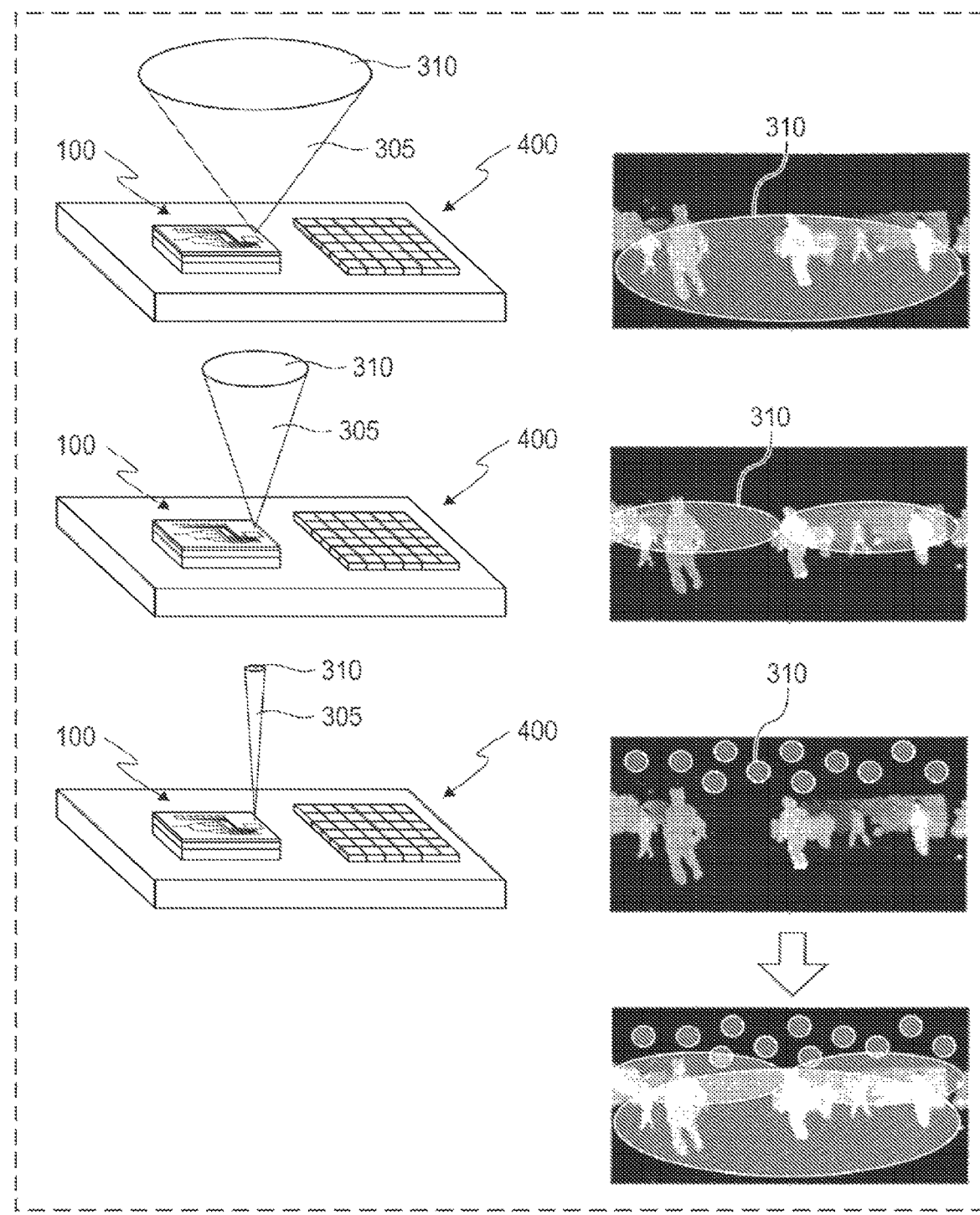
FIG. 16 is a diagram schematically showing examples of light beams that are emitted from the optical scan device according to the present embodiment and examples of distance images.

FIG. 16 is a diagram schematically showing examples of light beams 305 that are emitted from the optical scan device 100 according to the present embodiment and examples of distance images.

The first, second, and third left drawings of FIG. 16 as counted from the top represent light beams 305, emitted from the optical scan device 100, that have a large beam spot 310, a medium beam spot 310, and a small beam spot 310, respectively.

The first, second, and third right drawings of FIG. 16 as counted from the top represent distance images obtained by the large beam spot 310, the medium beam spot 310, and the small beam spot 310, respectively. The lowermost right drawing of FIG. 16 represents a distance image into which the three distance images have been integrated.

As shown in FIG. 16, the optical scan device 100 acquires a plurality of distance images of physical objects at a short distance, a middle distance, and a long distance through a plurality of light beams of different directions and shapes. As shown in the lowermost right drawing of FIG. 16, a distance image of physical objects can be easily reconstructed by adding up and integrating the plurality of distance images into one distance image.

Examples of Application

Figure 17:
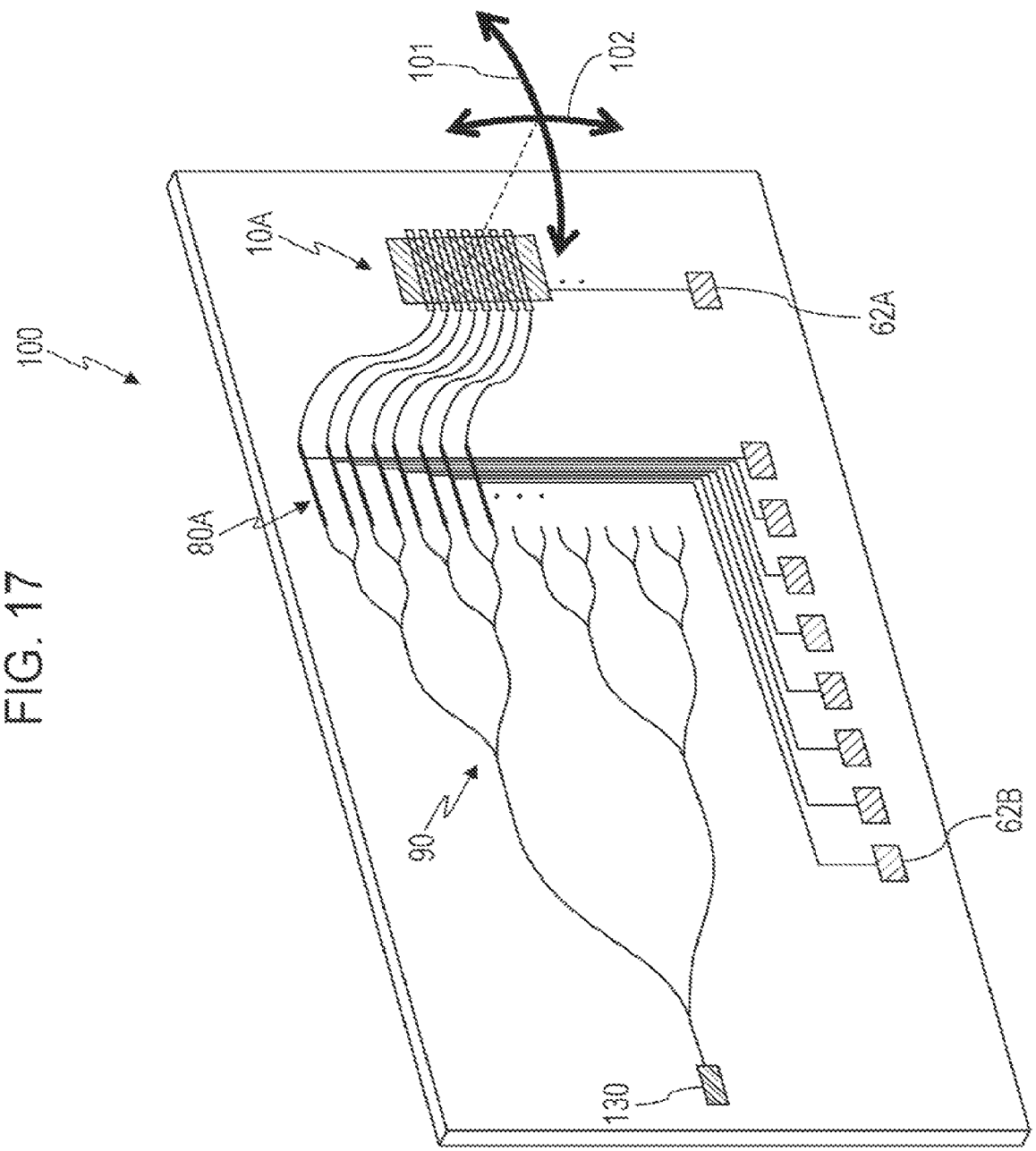
FIG. 17 is a diagram showing an example configuration of an optical scan device in which elements such as an optical divider, an optical waveguide array, a phase shifter array, and a light source are integrated on a circuit board.

FIG. 17 is a diagram showing an example configuration of an optical scan device 100 in which elements such as an optical divider 90, an optical waveguide array 10A, a phase shifter array 80A, and a light source 130 are integrated on a circuit board (e.g. a chip). The light source 130 may for example be a light-emitting element such as a semiconductor laser. In this example, the light source 130 emits single-wavelength light whose wavelength in free space is λ. The optical divider 90 divides the light from the light source 130 into lights and introduces the lights into optical waveguides of the plurality of phase shifters 80. In the example shown in FIG. 17, there are provided an electrode 62A and a plurality of electrodes 62B on the chip. The optical waveguide array 10A is supplied with a control signal from the electrode 62A. To the plurality of phase shifters 80 in the phase shifter array 80A, control signals are sent from the plurality of electrodes 62B, respectively. The electrode 62A and the plurality of electrodes 62B may be connected to a control circuit (not illustrated) that generates the control signals. The control circuit may be provided on the chip shown in FIG. 17 or may be provided on another chip in the optical scan device 100.

As shown in FIG. 17, an optical scan over a wide range can be achieved through a small-sized device by integrating all components on the chip. For example, all of the components shown in FIG. 17 can be integrated on a chip measuring approximately 2 mm by 1 mm.

Figure 18:
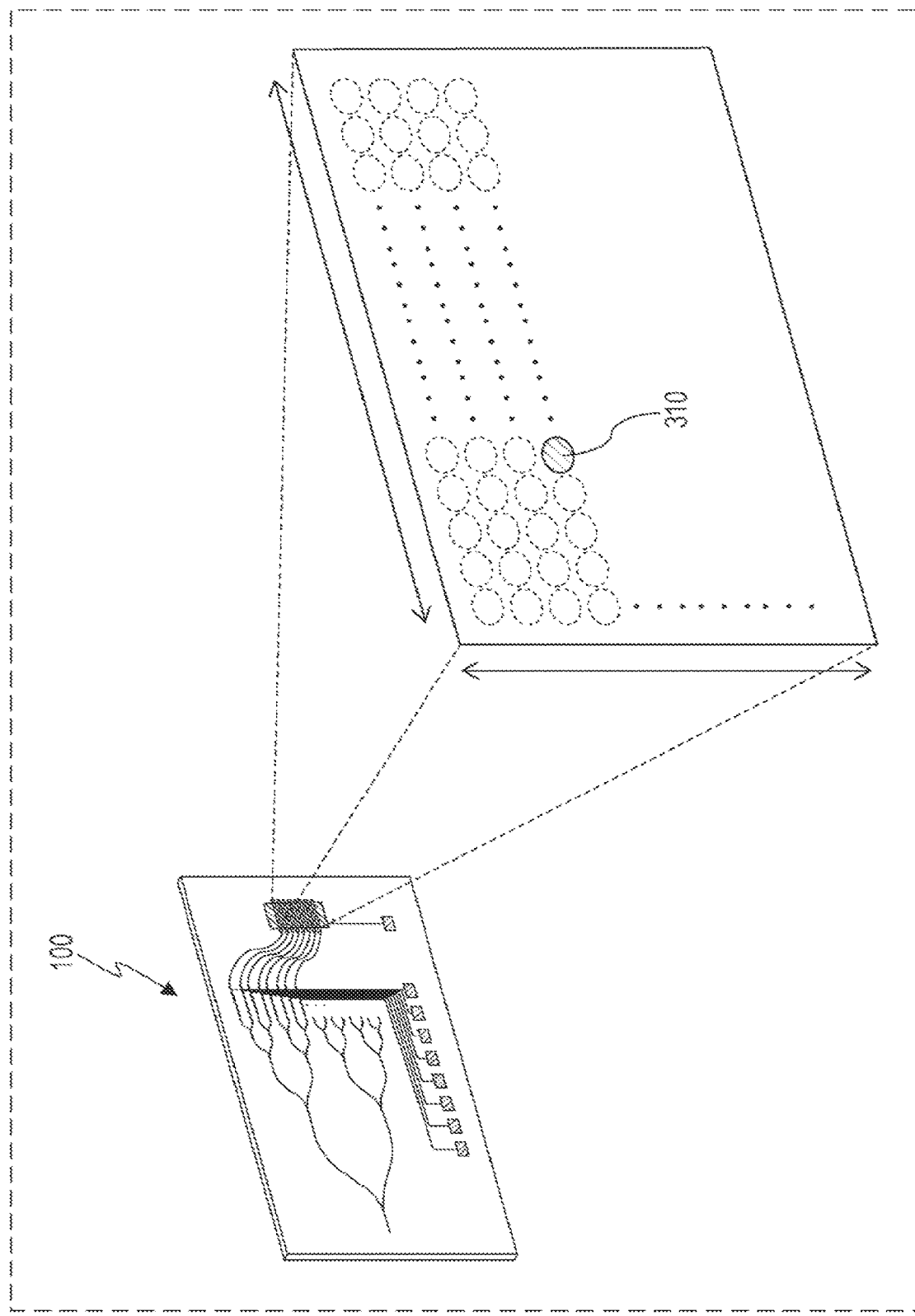
FIG. 18 is a schematic view showing how a two-dimensional scan is being executed by irradiating a distant place with a light beam such as a laser from the optical scan device.

FIG. 18 is a schematic view showing how a two-dimensional scan is being executed by irradiating a distant place with a light beam such as a laser from the optical scan device 100. A two-dimensional can is executed by moving a beam spot 310 in horizontal and vertical directions. For example, a two-dimensional ranging image can be acquired by a combination with a publicly-known TOF method. The TOF method is a method for, by observing light reflected from a physical object irradiated with a laser, calculating the time of fight of the light to figure out the distance.

Figure 19:
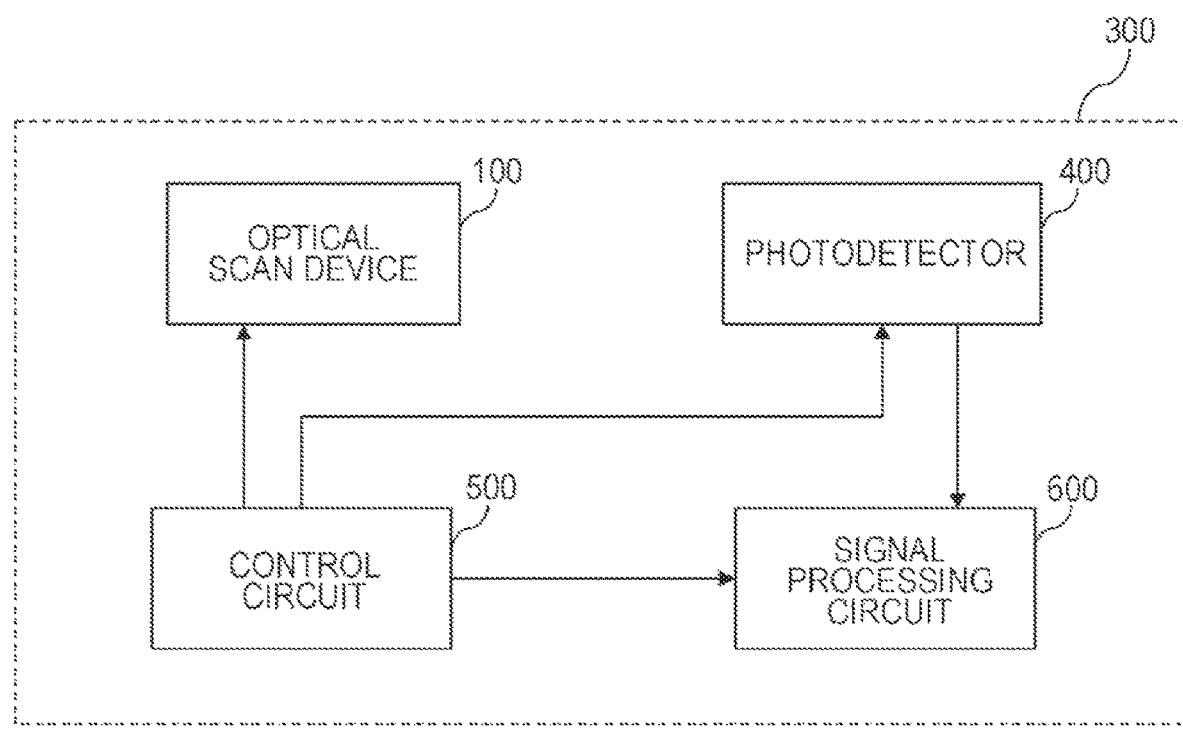
FIG. 19 is a block diagram showing an example configuration of a LiDAR system that is capable of generating a ranging image.

FIG. 19 is a block diagram showing an example configuration of a LiDAR system 300 serving as an example of a photodetection system that is capable of generating such a ranging image. The LiDAR system 300 includes an optical scan device 100, a photodetector 400, a signal processing circuit 600, and a control circuit 500. The photodetector 400 detects light emitted from the optical scan device 100 and reflected from a physical object. The photodetector 400 may for example be an image sensor that has sensitivity to the wavelength λ of light that is emitted from the optical scan device 100 or a photodetector including a photosensitive element such as a photodiode. The photodetector 400 outputs an electrical signal corresponding to the amount of light received. The signal processing circuit 600 calculates the distance to the physical object on the basis of the electrical signal outputted from the photodetector 400 and generates distance distribution data. The distance distribution data is data that represents a two-dimensional distribution of distance (i.e. a ranging image). The control circuit 500 is a processor that controls the optical scan device 100, the photodetector 400, and the signal processing circuit 600. The control circuit 500 controls the timing of irradiation with a light beam from the optical scan device 100 and the timing of exposure and signal readout of the photodetector 400 and instructs the signal processing circuit 600 to generate a ranging image.

The frame rate at which a ranging image is acquired by a two-dimensional scan can be selected, for example, from among 60 fps, 50 fps, 30 fps, 25 fps, 24 fps, or other frame rates, which are commonly used to acquire moving images. Further, in view of application to an onboard system, a higher frame rate leads to a higher frequency of acquisition of a ranging image, making it possible to accurately detect an obstacle. For example, in the case of a vehicle traveling at 60 km/h, a frame rate of 60 fps makes it possible to acquire an image each time the vehicle moves approximately 28 cm. A frame rate of 120 fps makes it possible to acquire an image each time the vehicle moves approximately 14 cm. A frame rate of 180 fps makes it possible to acquire an image each time the vehicle moves approximately 9.3 cm.

The time required to acquire one ranging image depends on the speed of a beam scan. For example, in order for an image whose number of resolvable spots is 100 by 100 to be acquired at 60 fps, it is necessary to perform a beam scan at 1.67 μs or less per point. In this case, the control circuit 500 controls the emission of a light beam by the optical scan device 100 and the storage and readout of a signal by the photodetector 400 at an operating speed of 600 kHz.

Example of Application to Optical Receiver Device

Each of the optical scan devices according to the aforementioned embodiments of the present disclosure can also be used as an optical receiver device of similar configuration. The optical receiver device includes an optical waveguide array 10A which is identical to that of the optical scan device and a first adjusting element that adjusts the direction of light that can be received. Each of the first mirrors 30 of the optical waveguide array 10A transmits light falling on a side thereof opposite to a first specular surface from the third direction. Each of the optical waveguide layers 20 of the optical waveguide array 10A causes the light transmitted through the first mirror 30 to propagate in the second direction. The direction of light that can be received can be changed by the first adjusting element changing at least one of the refractive index of the optical waveguide layer 20 of each optical waveguide element 10, the thickness of the optical waveguide layer 20 of each optical waveguide element 10, or the wavelength of light. Furthermore, in a case where the optical receiver device includes a plurality of phase shifters 80 or 80a and 80b which are identical to those of the optical scan device and a second adjusting element that varies differences in phase among lights that are outputted through the plurality of phase shifters 80 or 80a and 80b from the plurality of optical waveguide elements 10, the direction of light that can be received can be two-dimensionally changed.

For example, an optical receiver device can be configured such that the light source 130 of the optical scan device 100 shown in FIG. 17 is substituted by a receiving circuit. When light of wavelength λ falls on the optical waveguide array 10A, the light is sent to the optical divider 90 through the phase shifter array 80A, is finally concentrated on one place, and is sent to the receiving circuit. The intensity of the light concentrated on that one place can be said to express the sensitivity of the optical receiver device. The sensitivity of the optical receiver device can be adjusted by adjusting elements incorporated separately into the optical waveguide array 10A and the phase shifter array 80A. The optical receiver device is opposite in direction of the wave number vector (in the drawing, the bold arrow) shown, for example, in FIG. 4. Incident light has a light component acting in the direction (in the drawing, the X direction) in which the optical waveguide elements 10 extend and a light component acting in the array direction (in the drawing, the Y direction) of the optical waveguide elements 10. The sensitivity to the light component acting in the X direction can be adjusted by the adjusting element incorporated into the optical waveguide array 10A. Meanwhile, the sensitivity to the light component acting in the array direction of the optical waveguide elements 10 can be adjusted by the adjusting element incorporated into the phase shifter array 80A. θ and $\alpha_0$ shown in FIG. 4 are found from the phase difference $\Delta\varphi$ of light and the refractive index $n_w$ and thickness d of the optical waveguide layer 20 at which the sensitivity of the optical receiver device reaches its maximum. This makes it possible to identify the direction of incidence of light.

The aforementioned embodiments may be combined as appropriate.

An optical scan device and an optical receiver device according to an embodiment of the present disclosure are applicable, for example, to a use such as a LiDAR system that is mounted on a vehicle such as an automobile, a UAV, or an AGV.

What is claimed is:

1. A photodetection system comprising:
   an optical scan device that includes:
      an optical waveguide array, including a plurality of optical waveguides and;
      a phase shifter array including a plurality of phase shifters connected separately to each of the plurality of optical waveguides;
   a control circuit that controls a phase shift amount of each of the plurality of phase shifters and/or inputting of light to each of the plurality of phase shifters and thereby controls a direction and shape of the light beam that is emitted from the optical scan device;
   a photodetector that detects the light beam reflected by a physical object; and
   a signal processing circuit that generates distance distribution data on the basis of output from the photodetector.

2. The photodetection system according to claim 1, wherein the control circuit is capable of independently changing a first control parameter that controls the direction of the light beam and a second control parameter that controls the shape of the light beam.

3. The photodetection system according to claim 2, wherein
   the phase shift amount of each of the plurality of phase shifters is a sum of a first shift amount and a second shift amount, and
   the control circuit controls the direction of the light beam by controlling the first control shift amount of each of the plurality of phase shifters and controls the shape of the light beam by controlling the second shift amount of each of the plurality of phase shifters.

4. The photodetection system according to claim 3, wherein
   the control circuit determines the first shift amount of each of the plurality of phase shifters so that the first shift amount varies by a constant amount in an order in which the plurality of phase shifters are arrayed.

5. The photodetection system according to claim 3, wherein the control circuit adjusts the second shift amount of each of the plurality of phase shifters and thereby causes the optical scan device to emit a light beam having a predetermined spread angle.

6. The photodetection system according to claim 5, wherein the control circuit determines the second shift amount of each of the plurality of phase shifters on the basis of random numbers.

7. The photodetection system according to claim 2, wherein the control circuit controls the direction of the light beam by controlling the phase shift amount of each of the plurality of phase shifters and controls the shape of the light beam by controlling the inputting of the light to each of the plurality of phase shifters.

8. The photodetection system according to claim 1, wherein
   the plurality of phase shifters are constituted by a plurality of phase shifter groups,
   each of the plurality of phase shifter groups includes one or more phase shifters, and
   a difference in phase shift amount between two phase shifters at a boundary between adjacent phase shifter groups is different from a difference in phase shift amount between two adjacent phase shifters in one phase shifter group.

9. A photodetection system comprising:
   an optical scan device that is capable of controlling a direction and shape of a light beam;
   a plurality of photosensitive elements that detect the light beams reflected by a scene;
   a control circuit that controls the direction and shape of the light beam that is emitted from the optical scan device; and
   a signal processing circuit that generates distance distribution data on the basis of output from the photosensitive elements,
   wherein the control circuit causes the optical scan device to emit a plurality of light beams differing in direction of emission and spread angle from each other, and
   the photosensitive elements detect the plurality of light beams reflected by the scene.

10. The photodetection system according to claim 9, wherein the optical scan device irradiates, with the light beam having a first spread angle, a first area in the scene and irradiates, with the light beam having a second spread angle that is larger than the first spread angle, a second area in the scene that is at a shorter distance than the first area.

11. The photodetection system according to claim 9, wherein the signal processing circuit integrates the distance distribution data obtained by the photosensitive elements detecting the plurality of light beams.

12. The photodetection system according to claim 9, wherein the plurality of light beams include a diffused beam and a line scan beam.

13. The photodetection system according to claim 9, wherein the plurality of light beams include a diffused beam and a two-dimensional scan beam.

14. The photodetection system according to claim 9, wherein the plurality of light beams include a line scan beam and a two-dimensional scan beam.

15. The photodetection system according to claim 9, wherein the optical scan device includes a light source and an optical deflector integrated on a chip.

16. The photodetection system according to claim 9, wherein the optical scan device includes an optical waveguide array and a phase shifter array.

17. A method comprising:
   causing the optical scan device that is capable of controlling a direction and shape of a light beam to emit a plurality of light beams differing in direction of emission and spread angle from each other; and
   causing a plurality of photosensitive elements to detect the plurality of light beams reflected by a scene;

generating distance distribution data on the basis of output from the photosensitive elements.

\* \* \* \* \*